(12) United States Patent
Davidson et al.

(10) Patent No.: US 9,589,538 B2
(45) Date of Patent: *Mar. 7, 2017

(54) CONTROLLING VIRTUAL OBJECTS

(71) Applicant: Perceptive Pixel, Inc., New York, NY (US)

(72) Inventors: Philip L. Davidson, New York, NY (US); Jefferson Y. Han, Holliswood, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 741 days.

This patent is subject to a terminal disclaimer.

(21) Appl. No.: 13/654,365

(22) Filed: Oct. 17, 2012

(65) Prior Publication Data

US 2014/0104320 A1 Apr. 17, 2014

(51) Int. Cl.
*G09G 5/32* (2006.01)
*G06F 3/0488* (2013.01)

(52) U.S. Cl.
CPC ............. *G09G 5/32* (2013.01); *G06F 3/0488* (2013.01); *G06F 3/04886* (2013.01);
(Continued)

(58) Field of Classification Search
CPC .... G06F 3/0481; G06F 9/4443; G06F 3/0482; G06F 3/04847; G06Q 10/10
See application file for complete search history.

(56) References Cited

U.S. PATENT DOCUMENTS 5,367,625 A * 11/1994 Ishitani ............... G06F 3/04842
345/619
5,523,775 A 6/1996 Capps
(Continued)

OTHER PUBLICATIONS

Brandl, P. et al., "Combining and Measuring the Benefits of Bimanual Pen and Direct-Touch Interaction on Horizontal Interfaces," Proceedings of the Working Conference on Advanced Visual Interfaces (AVI '08), May 28, 2008, 8 pages.
(Continued)

*Primary Examiner* — Jung-Mu Chuang
(74) *Attorney, Agent, or Firm* — Brandon Roper; Judy Yee; Micky Minhas

(57) ABSTRACT

Controlling virtual objects displayed on a display device includes controlling display, on a display device, of multiple virtual objects, each of the multiple virtual objects being capable of movement based on a first type of input and being capable of alteration based on a second type of input that is different than the first type of input, the alteration being different from movement. A subset of the multiple virtual objects as candidates for restriction is identified, and based on identifying the subset of virtual objects as candidates for restriction, a responsiveness to the first type of input for the subset of virtual objects is restricted. The first type of input applied to a first virtual object included in the subset of virtual objects and a second virtual object included in the multiple virtual objects is detected, with the second virtual object being excluded from the subset of virtual objects. Based on detecting the first type of input applied to the first virtual object and the second virtual object, movement of the first virtual object is controlled in accordance with the restricted responsiveness to the first type of input, and movement of the second virtual object is controlled without restriction.

18 Claims, 28 Drawing Sheets

(52) U.S. Cl.
CPC ............ *G06F 2203/04104* (2013.01); *G06F 2203/04106* (2013.01); *G06F 2203/04808* (2013.01)

(56) References Cited

U.S. PATENT DOCUMENTS

| | | | | |
|---|---|---|---|---|
| 5,784,061 | A * | 7/1998 | Moran | G06F 3/04883 345/173 |
| 6,266,050 | B1 | 7/2001 | Oh et al. | |
| 6,323,846 | B1 * | 11/2001 | Westerman | G06F 3/0235 345/173 |
| 7,050,046 | B1 * | 5/2006 | Park | G06K 9/00416 345/173 |
| 7,062,090 | B2 | 6/2006 | Simmons et al. | |
| 7,131,073 | B2 * | 10/2006 | Rosenberg | G05G 9/047 715/701 |
| 7,164,410 | B2 | 1/2007 | Kupka | |
| 7,509,588 | B2 * | 3/2009 | Van Os | G06F 3/04817 345/156 |
| 7,743,348 | B2 * | 6/2010 | Robbins | G06F 3/0421 715/767 |
| 7,864,181 | B1 * | 1/2011 | Baraff | G06F 17/5009 345/473 |
| 8,004,498 | B1 * | 8/2011 | Meridian | G06F 3/04845 345/156 |
| 8,115,753 | B2 * | 2/2012 | Newton | G06F 3/0421 178/18.09 |
| 8,269,739 | B2 * | 9/2012 | Hillis | G06F 3/011 178/18.01 |
| 8,483,518 | B2 * | 7/2013 | Zhu | G06F 17/30247 382/100 |
| 8,576,222 | B2 * | 11/2013 | Handley | G06F 3/016 345/419 |
| 8,619,038 | B2 * | 12/2013 | Chaudhri | G06F 3/04817 345/173 |
| 8,633,898 | B2 * | 1/2014 | Westerman | G06F 3/0235 178/18.01 |
| 8,648,816 | B2 * | 2/2014 | Homma | G06F 3/0414 178/18.05 |
| 8,660,978 | B2 * | 2/2014 | Hinckley | G06F 3/038 706/52 |
| 8,669,949 | B2 * | 3/2014 | Cipriano | G06F 1/3203 345/173 |
| 8,874,557 | B2 * | 10/2014 | Lin | G06F 17/30259 707/723 |
| 8,881,039 | B2 * | 11/2014 | Hammack | G06T 3/0012 715/764 |
| 9,244,545 | B2 * | 1/2016 | Hinckley | G06F 3/038 |
| 2002/0050978 | A1 * | 5/2002 | Rosenberg | G05G 9/047 345/156 |
| 2002/0080180 | A1 * | 6/2002 | Mander | G06F 3/0483 715/769 |
| 2004/0150630 | A1 * | 8/2004 | Hinckley | G06F 3/0418 345/173 |
| 2005/0052427 | A1 * | 3/2005 | Wu | G06F 3/04883 345/173 |
| 2005/0243054 | A1 * | 11/2005 | Beymer | A61B 3/0033 345/156 |
| 2006/0026521 | A1 * | 2/2006 | Hotelling | G06F 3/0418 715/702 |
| 2006/0119586 | A1 * | 6/2006 | Grant | G06F 3/016 345/173 |
| 2006/0277466 | A1 * | 12/2006 | Anderson | G06F 3/017 715/700 |
| 2007/0242056 | A1 * | 10/2007 | Engelhardt | G06F 3/0416 345/173 |
| 2007/0268273 | A1 * | 11/2007 | Westerman | G06F 3/0235 345/173 |
| 2008/0016461 | A1 * | 1/2008 | Hoblit | G06F 3/048 715/788 |
| 2008/0174570 | A1 * | 7/2008 | Jobs | G06F 3/0488 345/173 |
| 2008/0259053 | A1 * | 10/2008 | Newton | G06F 3/0421 345/175 |
| 2009/0006958 | A1 * | 1/2009 | Pohjola | G06F 3/0488 715/710 |
| 2009/0058821 | A1 * | 3/2009 | Chaudhri | G06F 3/04817 345/173 |
| 2009/0184939 | A1 | 7/2009 | Wohlstadter et al. | |
| 2010/0225604 | A1 * | 9/2010 | Homma | G06F 3/0414 345/173 |
| 2010/0235767 | A1 * | 9/2010 | Hammack | G06T 3/0012 715/763 |
| 2010/0251112 | A1 | 9/2010 | Hinckley et al. | |
| 2010/0306705 | A1 | 12/2010 | Nilsson | |
| 2011/0012921 | A1 | 1/2011 | Cholewin et al. | |
| 2011/0202856 | A1 * | 8/2011 | Handley | G06F 3/016 715/764 |
| 2011/0208716 | A1 * | 8/2011 | Liu | G06F 17/30247 707/710 |
| 2011/0231797 | A1 | 9/2011 | Huhtala et al. | |
| 2012/0158629 | A1 * | 6/2012 | Hinckley | G06F 3/038 706/15 |
| 2012/0236026 | A1 | 9/2012 | Hinckley et al. | |
| 2012/0242603 | A1 * | 9/2012 | Engelhardt | G06F 3/03545 345/173 |
| 2012/0249474 | A1 * | 10/2012 | Pratt | G06F 1/1694 345/174 |
| 2012/0262407 | A1 * | 10/2012 | Hinckley | G06F 3/038 345/173 |
| 2012/0274585 | A1 * | 11/2012 | Telfer | G06F 3/0488 345/173 |
| 2013/0033436 | A1 | 2/2013 | Brinda et al. | |
| 2013/0097550 | A1 * | 4/2013 | Grossman | G06F 3/0488 715/779 |
| 2013/0108111 | A1 * | 5/2013 | Karazi | G01S 5/16 382/103 |
| 2013/0174100 | A1 * | 7/2013 | Seymour | G06F 3/0487 715/863 |
| 2013/0207938 | A1 * | 8/2013 | Ryshtun | G06F 3/0416 345/179 |
| 2013/0298195 | A1 * | 11/2013 | Liu | G06F 17/30247 726/3 |
| 2013/0314341 | A1 * | 11/2013 | Lee | G06F 3/0488 345/173 |
| 2014/0033124 | A1 * | 1/2014 | Sorrick | G06F 3/048 715/810 |
| 2014/0053111 | A1 * | 2/2014 | Beckman | G06F 3/04812 715/856 |
| 2014/0108979 | A1 | 4/2014 | Davidson et al. | |

OTHER PUBLICATIONS

Frisch, M. et al., "Investigating Multi-Touch and Pen Gestures for Diagram Editing on Interactive Surfaces," Proceedings of the ACM International Conference on Interactive Tabletops and Surfaces (ITS '09), Nov. 23, 2009, 8 pages.

Lai, R., "Wacom Bamboo Pen & Touch Review," Engadget.com Website, Available Online at http://www.engadget.com/2009/12/10/wacom-bamboo-pen-and-touch-review/, Dec. 10, 2009, 5 pages.

Hinckley, K. et al., "Manual Dexterity: An Exploration of Simultaneous Pen + Touch Direct Input," Extended Abstracts on Human Factors in Computing Systems (CHI '10), Apr. 10, 2010, 10 pages.

"Pen and Touch Input in Windows Vista," Microsoft Developer Network Website, Available Online at https://msdn.microsoft.com/en-us/library/ms702418(v=VS.85).aspx, Available as Early as Feb. 8, 2011, 4 pages.

* cited by examiner

FIG. 8

| Detection Made | Assigned Score |
| --- | --- |
| Object Type = Unalterable | - 10 |
| Object Type = Frequently Altered | + 0.2 |
| Object Type = Infrequently Altered | 0 |
| Touch Input Indicates Altering Position | + 0.2 |
| Touch Input Does Not Indicate Altering Position | - 0.1 |
| Object Location In Alteration Area | + 0.2 |
| Object Location Outside Alteration Area | - 0.2 |
| Object Touched By Stylus | + 10 |
| Object Directly Under Hovering Stylus | + 0.8 |
| Object Within Threshold Distance of Touching Stylus | + 0.3 |
| Object Within Threshold Distance of Hovering Stylus | + 0.4 |
| Hierarchically Related to Restriction Candidate | + Score of Restriction Candidate |
| Unrelated to Restriction Candidate | 0 |
| Position Relative to Touch Input Suggests Alteration (e.g., centered between adjacent resting forearms) | + 0.2 |
| Position Relative to Touch Input Does Not Suggest Alteration (e.g., not between adjacent resting forearms or very close to resting forearm) | - 0.2 |

| Threshold Ranges | < 0.5 | 0.5 to 1.0 | > 1.0 |
| --- | --- | --- | --- |
| Restriction Level | None | Medium | High |

CONTROLLING VIRTUAL OBJECTS

TECHNICAL FIELD

This disclosure relates to controlling virtual objects.

BACKGROUND

Manipulating virtual objects displayed on a display device may include using both stylus and touch inputs. Different types of virtual objects may be displayed and manipulated over an entire canvas of the display device. Accordingly, certain ones of the different types of virtual objects may be inadvertently manipulated. For example, an inadvertent touch input upon the display device, such as a user resting their palm upon the display device or a user lifting the stylus from the display device in a hovering position just barely above the display device, may cause an undesired selection and/or manipulation of virtual objects displayed upon the display device. Similarly, an inadvertent touch input upon the display device, such as a user resting a palm or elbow making contact with the display device, may cause an unintended selection and/or manipulation of virtual objects displayed upon the display device.

SUMMARY

Techniques are described for controlling the manipulation of displayed virtual objects.

In some implementations, controlling virtual objects displayed on a display device includes controlling display, on a display device, of multiple virtual objects, each of the multiple virtual objects being capable of movement based on a first type of input and being capable of alteration based on a second type of input that is different than the first type of input, the alteration being different from movement. A subset of the multiple virtual objects as candidates for restriction is identified, and based on identifying the subset of virtual objects as candidates for restriction, a responsiveness to the first type of input for the subset of virtual objects is restricted. The first type of input applied to a first virtual object included in the subset of virtual objects and a second virtual object included in the multiple virtual objects is detected, with the second virtual object being excluded from the subset of virtual objects. Based on detecting the first type of input applied to the first virtual object and the second virtual object, movement of the first virtual object is controlled in accordance with the restricted responsiveness to the first type of input, and movement of the second virtual object is controlled without restriction.

In some implementations, performing the operation related to restricting, for the subset of virtual objects, responsiveness to the first type of input comprises restricting, for the subset of virtual objects, movement that occurs based on the first type of input while enabling alteration of the subset of virtual objects based on the second type of input, the movement that occurs based on the first type of input for the subset of virtual objects being less than movement that occurs based on the first type of input for the multiple virtual objects that are excluded from the subset of virtual objects.

In some implementations, restricting, for the subset of virtual objects, responsiveness to the first type of input comprises locking the subset of virtual objects such that the subset of virtual objects are unresponsive to the first type of input, and controlling movement of the first virtual object in accordance with the restricted responsiveness to the first type of input comprises ignoring the first type of input applied to the first virtual object, and maintaining a position of the first virtual object despite the first type of input applied to the first virtual object.

In some implementations, restricting, for the subset of virtual objects, responsiveness to the first type of input includes increasing inertia of the subset of virtual objects such that the subset of virtual objects are responsive to the first type of input, but less responsive than prior to the increase in inertia.

In some implementations, restricting, for the subset of virtual objects, responsiveness to the first type of input includes detecting a stylus hovering over the first virtual object, based on detecting the stylus hovering over the first virtual object, increasing inertia of the first virtual object such that the first virtual object is responsive to the first type of input, but less responsive than prior to the increase in inertia, detecting the stylus contacting the first virtual object, and based on detecting the stylus contacting the first virtual object, locking the first virtual object such that the first virtual object is unresponsive to the first type of input.

In some implementations restricting, for the subset of virtual objects, responsiveness to the first type of input comprises configuring the subset of virtual objects to remain unresponsive to the first type of input until a threshold level of the first type of input has been met, and controlling movement of the first virtual object in accordance with the restricted responsiveness to the first type of input comprises damping motion of the first virtual object until the first type of input applied to the first virtual object meets the threshold level.

In some implementations, an alteration event of the first virtual object is detected, determining a time window to apply based upon the detected alteration event of the first virtual object and a history of alteration activity of the first virtual object is determined, detecting a potential end of the alteration event is detected, in response to detecting the potential end of the alteration event, continuing to restrict movement of the first virtual object continuously during the determined time window, during the determined time window, for input indicating return to the alteration event is monitored, and, based on the determined time window expiring without detecting the input indicating return to the alteration event during the monitoring, the restriction on movement of the first virtual object is released.

In some implementations, restricting, for the subset of virtual objects, responsiveness to the first type of input comprises determining, for the first virtual object, a first constraint to place on a first type of motion that occurs based on the first type of input, determining, for the first virtual object, a second constraint to place on a second type of motion that occurs based on the first type of input, the second constraint being different from the first constraint and the second type of motion being different from the first type of motion, restricting, for the first virtual object, responsiveness to the first type of motion that occurs based on the first type of input in accordance with the first constraint, and restricting, for the first virtual object, responsiveness to the second type of motion that occurs based on the first type of input in accordance with the second constraint.

In some implementations, controlling movement of the first virtual object in accordance with the restricted responsiveness to the first type of input comprises controlling the first type of motion that occurs based on the first type of input applied to the first virtual object in accordance with the first constraint, and controlling the second type of motion that occurs based on the first type of input applied to the first virtual object in accordance with the second constraint.

In some implementations, determining, for the first virtual object, the first constraint to place on the first type of motion that occurs based on the first type of input comprises determining, for the first virtual object, a first constraint to place on translation that occurs based on the first type of input, In some implementations, determining, for the first virtual object, the second constraint to place on the second type of motion that occurs based on the first type of input comprises determining, for the first virtual object, a second constraint to place on rotation that occurs based on the first type of input.

In some implementations, controlling the first type of motion that occurs based on the first type of input applied to the first virtual object in accordance with the first constraint comprises controlling translation of the first virtual object that occurs based on the first type of input applied to the first virtual object in accordance with the first constraint.

In some implementations, controlling the second type of motion that occurs based on the first type of input applied to the first virtual object in accordance with the second constraint comprises controlling rotation of the first virtual object that occurs based on the first type of input applied to the first virtual object in accordance with the second constraint.

In some implementations, determining, for the first virtual object, the first constraint to place on the first type of motion that occurs based on the first type of input comprises determining, for the first virtual object, a first constraint to place on scaling that occurs based on the first type of input.

In some implementations, determining, for the first virtual object, the second constraint to place on the second type of motion that occurs based on the first type of input comprises determining, for the first virtual object, a second constraint to place on rotation that occurs based on the first type of input.

In some implementations, controlling the first type of motion that occurs based on the first type of input applied to the first virtual object in accordance with the first constraint comprises controlling scaling of the first virtual object that occurs based on the first type of input applied to the first virtual object in accordance with the first constraint.

In some implementations, controlling the second type of motion that occurs based on the first type of input applied to the first virtual object in accordance with the second constraint comprises controlling rotation of the first virtual object that occurs based on the first type of input applied to the first virtual object in accordance with the second constraint.

In some implementations, determining, for the first virtual object, the first constraint to place on the first type of motion that occurs based on the first type of input comprises determining, for the first virtual object, a first constraint to place on translation that occurs based on the first type of input.

In some implementations, determining, for the first virtual object, the second constraint to place on the second type of motion that occurs based on the first type of input comprises determining, for the first virtual object, a second constraint to place on scaling that occurs based on the first type of input.

In some implementations, controlling the first type of motion that occurs based on the first type of input applied to the first virtual object in accordance with the first constraint comprises controlling translation of the first virtual object that occurs based on the first type of input applied to the first virtual object in accordance with the first constraint.

In some implementations, controlling the second type of motion that occurs based on the first type of input applied to the first virtual object in accordance with the second constraint comprises controlling scaling of the first virtual object that occurs based on the first type of input applied to the first virtual object in accordance with the second constraint.

In some implementations, the display of the multiple virtual objects is updated to indicate the subset of virtual objects identified as candidates for restriction.

In some implementations, the display of the multiple virtual objects is updated to indicate a manner in which at least one of the subset of virtual objects identified as candidates for restriction has been restricted.

In some implementations, the display of the multiple virtual objects is updated to indicate that the first type of input has been applied to the first virtual object, but that the first type of input has been applied to the first virtual object has been restricted.

In some implementations, information is stored, in a memory device of the display device, regarding a state of the display device, the state including location, position, and restrictions placed on virtual objects displayed on the display device. A prior restriction decision applied to a particular virtual object was incorrect is detected. Based upon detecting that the prior restriction decision applied to the particular virtual object was incorrect, the prior restriction decision applied to the particular virtual object is updated to a correct restriction decision. Based on the information regarding the state of the display device and the correct restriction decision, a state of the display device is reverted to reflect a state that would have resulted had the correct restriction decision been made.

In some implementations, detecting that the prior restriction decision applied to the particular virtual object was incorrect comprises detecting that a decision not to restrict the particular virtual object was incorrect.

In some implementations, updating the prior restriction decision applied to the particular virtual object to the correct restriction decision comprises updating the decision not to restrict the particular virtual object to a decision to restrict the particular virtual object.

In some implementations, reverting a state of the display device to reflect a state that would have resulted had the correct restriction decision been made comprises reverting a state of the display device to reflect a state that would have resulted had the particular virtual object been restricted.

In some implementations, detecting that the prior restriction decision applied to the particular virtual object was incorrect comprises detecting that a decision to restrict the particular virtual object was incorrect.

In some implementations, updating the prior restriction decision applied to the particular virtual object to the correct restriction decision comprises updating the decision to restrict the particular virtual object to a decision not to restrict the particular virtual object.

In some implementations, reverting a state of the display device to reflect a state that would have resulted had the correct restriction decision been made comprises reverting a state of the display device to reflect a state that would have resulted had the particular virtual object not been restricted.

In some implementations, the first type of input includes touch input from a user's hand and the second type of input includes input from a stylus.

In some implementations, one or more computers and one or more storage devices storing instructions that are operable, when executed by the one or more computers, to cause the one or more computers to perform operations comprising In some implementations, controlling virtual objects displayed on a display device includes controlling display, on a display device, of multiple virtual objects, each of the multiple virtual objects being capable of movement based on a first type of input and being capable of alteration based on a second type of input that is different than the first type of input, the alteration being different from movement. A subset of the multiple virtual objects as candidates for restriction is identified, and based on identifying the subset of virtual objects as candidates for restriction, a responsiveness to the first type of input for the subset of virtual objects is restricted. The first type of input applied to a first virtual object included in the subset of virtual objects and a second virtual object included in the multiple virtual objects is detected, with the second virtual object being excluded from the subset of virtual objects. Based on detecting the first type of input applied to the first virtual object and the second virtual object, movement of the first virtual object is controlled in accordance with the restricted responsiveness to the first type of input, and movement of the second virtual object is controlled without restriction.

In some implementations, a non-transitory computer-readable storage medium storing software comprising instructions executable by one or more computers which, upon such execution, cause the one or more computers to perform operations comprising controlling virtual objects displayed on a display device includes controlling display, on a display device, of multiple virtual objects, each of the multiple virtual objects being capable of movement based on a first type of input and being capable of alteration based on a second type of input that is different than the first type of input, the alteration being different from movement. A subset of the multiple virtual objects as candidates for restriction is identified, and based on identifying the subset of virtual objects as candidates for restriction, a responsiveness to the first type of input for the subset of virtual objects is restricted. The first type of input applied to a first virtual object included in the subset of virtual objects and a second virtual object included in the multiple virtual objects is detected, with the second virtual object being excluded from the subset of virtual objects. Based on detecting the first type of input applied to the first virtual object and the second virtual object, movement of the first virtual object is controlled in accordance with the restricted responsiveness to the first type of input, and movement of the second virtual object is controlled without restriction.

DESCRIPTION OF DRAWINGS

FIG. 8 is a table of example scoring weights and threshold scores used in classifying displayed objects.

DETAILED DESCRIPTION

Display devices, such as contact-sensitive display devices, make use of contact input in order to manipulate objects, e.g., virtual objects, displayed on the display devices. In some implementations, a first type of input, such as input from a stylus, is used to provide the contact input to the display device for altering the virtual objects (e.g., writing on, reshaping, etc.). In these implementations, a second type of input, such as a user's touch, is used to provide the contact input to the display device for moving (e.g., translating, rotating, etc.) or updating a view (e.g., zooming, scrolling, etc.) of the virtual objects. Techniques are described throughout this disclosure for controlling virtual objects to appropriately respond to both the first type of input and the second type of input.

Figure 1:
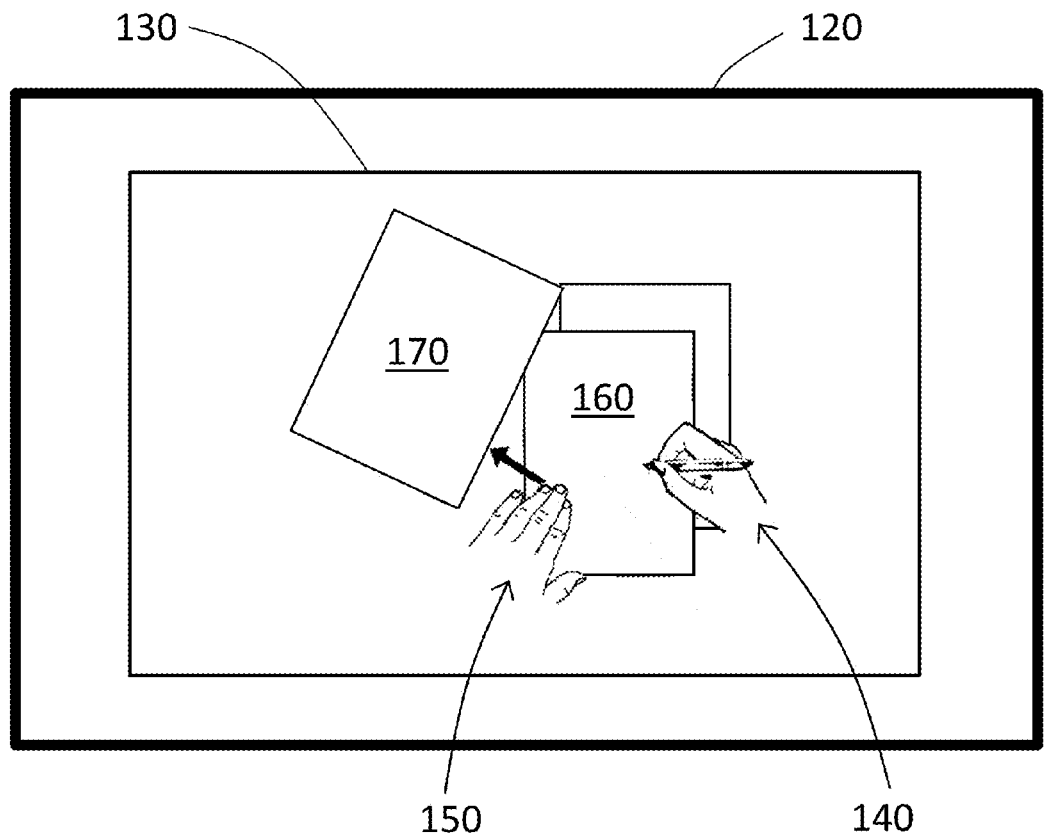
FIG. 1 is a diagram of an example display system configured to provide a user with the ability to manipulate displayed objects arranged on a canvas region.

FIG. 1 illustrates an example display system 100 configured to provide a user with the ability to manipulate displayed objects arranged on a canvas region. In FIG. 1, the display system 100 includes a display device 120. The display device 120 displays at least one canvas 130, which includes several virtual objects. The display device 120 is configured to receive various inputs using contact-sensing detectors. For example, resistive touchscreens may be used. Alternatively, techniques including surface acoustic wave (SAW), capacitive sensing, surface capacitance sensing, projected capacitive touch (PCT) sensing, mutual capacitance sensing, and self-capacitance sensing may be used. In addition, infrared and optical imaging touchscreens, including Frustrated Total Internal Reflection (FTIR) touch sensors, may be used, as well as dispersive signal and acoustic pulse recognition technologies. The display system 100 may use any type of sensor configured to detect touch and stylus inputs.

As shown in FIG. 1, a user's right hand 140 is using a stylus to provide contact input at a contact-sensitive region of the display device 120 corresponding to a location of a first virtual object 160 displayed by the display device 120 within the canvas 130. The display system 100 detects the stylus input on the first virtual object 160 and performs an alteration of the first virtual object 160 based on the stylus input. For example, the first virtual object 160 may be a first virtual page and the display system 100 may alter the first virtual page by changing the first virtual page to have writing upon the first virtual page that corresponds to the stylus input. In this example, the display system 100 treats the stylus input as a virtual pen depositing ink on the first virtual page.

In addition to altering the first virtual object 160 based on the stylus input, the display system 100 restricts movement of (e.g., locks) the first virtual object 160 based on detection of the stylus input corresponding to a location of the first virtual object 160 at the display device using the stylus held in the user's right hand 140. By restricting movement of the first virtual object 160 within the canvas 130, the display system 100 limits the ability of the first virtual object 160 to be manipulated (e.g., translated, rotated, scaled, etc.) in response to touch input. For instance, the display system 100 may lock the first virtual object 160 such that, while the stylus input is detected, the first virtual object 160 does not respond to touch input and remains stationary regardless of the touch input provided. By locking the first virtual object 160, the display system 100 may enhance the ability of the user to alter the first virtual object 160 using the stylus because the first virtual object 160 remains stationary for inadvertent or incidental touch contacts on the first virtual object 160 that otherwise would result in movement of the first virtual object 160 and, potentially, inadvertent or stray marks from the stylus.

FIG. 1 also shows the user's left hand 150 making a swiping motion. The swiping motion occurs while the stylus input remains detected at the location of the first virtual object 160 and is an attempt by the user to slide a second virtual object 170 that partially overlaps the first virtual object 160 away from the first virtual object 160. However, as shown, the user has accidentally contacted the first virtual object 160 in attempting to move the second virtual object 170 and the display system 100 detects the swiping motion occurring over both the first virtual object 160 and the second virtual object 170.

In typical operation, the display system 100 would move both the first virtual object 160 and the second virtual object 170 based on detecting the swiping motion. However, because the display system 100 previously detected the stylus input on the first virtual object 160 and restricted movement of the first virtual object 160 (e.g., locked the first virtual object 160) based on detection of the stylus input, the display system 100 handles the detected swiping motion by leaving the first virtual object 160 stationary while moving the second virtual object 170 away from the first virtual object 160. In this regard, the display system 100 does not disrupt the user's ability to alter the first virtual object 160 using the stylus and allows the user to provide touch input to perform the desired action of sliding the second virtual object 170 away from the first virtual object 160. Accordingly, the display system 100 may intelligently handle the combined stylus and touch inputs shown in FIG. 1 by not allowing the accidental touch of the first virtual object 160 to impact the user's ability to alter the first virtual object 160.

Figure 2:
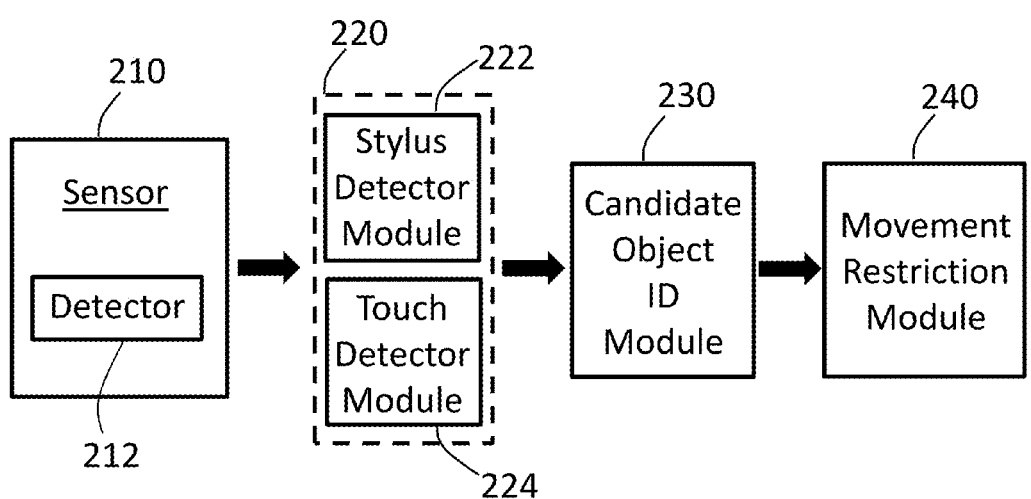
FIG. 2 is a schematic diagram of an example system for controlling manipulation of displayed objects.

FIG. 2 illustrates an example system 200 for controlling manipulation of displayed objects. In FIG. 2, the system 200 includes a sensor 210 that includes a detector 212 composed of a set of detection points. The sensor 210 is configured to detect user input when the user engages or contacts the detector 212 using one or more input mechanisms and then provide corresponding engagement data that enables identification of the locations of the user inputs on the detector 212. In some implementations, the detector 212 is positioned over the display of the multi-touch display system to thereby form a touch screen system. In other implementations, the detector 212 is separate from the display to thereby form a touchpad system. The system 200 further includes a detector 220, which includes a stylus detector module 222 that, alone or in conjunction with the detector 212 or with a different and independent second detector, is configured to detect user stylus input and to produce corresponding stylus engagement data that enables identification of the location of the stylus tip on the detector 212. The system 200 further includes various modules used to process the engagement data generated by the sensor 210 and/or the stylus detector module 222 and which may be implemented, for example, by one or more processors or circuits that are integrated within or separated from but in communication with the sensor 210 and/or the stylus detector module 222.

Specifically and as described in more detail below, the detector 220 of the system 200 includes a touch detector module 224 configured to identify touch inputs based on the engagement data produced by the sensor 210. Touch inputs are regions of contiguous user contact (or engagement) on the detector 212. In some implementations, a touch input may be represented by data identifying a subset of the detection points of the detector 212, where each of the detection points in the subset is a point that is in contact (or engaged) with a user input mechanism (i.e., user contact) and is positioned in the detector 212 adjacent to another such contacted point in the subset (i.e., contiguous).

The system 200 includes a candidate object identification (ID) module 230 configured to identify virtual objects as being possible candidates for restriction. In some implementations, virtual objects are identified as candidates for restriction (from manipulation, or movement) based upon the output from the detector module 220 indicating that the contact input received by the sensor 210 was from a stylus. Conversely, virtual objects may not be identified as candidates for restriction based upon the output from the detector module 220 indicating that the contact input received by the sensor 210 was from a touch. In some implementations, the candidate object ID module 230 may be selectively configured to identify virtual objects as being candidates for restriction based upon determining, by the detector module 220, that the contact input received by the sensor 210 was from a stylus or from a touch.

The candidate object ID module 230 is further configured to access the location of stylus inputs (either contact input or hover input), access the location of touch inputs, and determine positions of the virtual objects displayed on the display device. The candidate object ID module 230 uses the location of the stylus inputs, the location of the touch inputs, and the positions of the virtual objects to identify one or more (e.g., a subset) of the virtual objects as candidates for restriction. In some implementations, the candidate object ID module 230 may determine (or access) the positions of the virtual objects from the application generating the virtual objects displayed on the display device.

The movement restriction module 240 is configured to receive output from the candidate object ID module 230 and to restrict movement of the one or more candidate objects identified by the candidate object ID module 230. In some implementations, as detailed below, the restriction upon the one or more candidate objects identified by the candidate object ID module 230 may be variable.

In some examples, the restriction upon movement of the candidate object identified by the candidate object ID module 230 is relatively high, e.g., no substantial movement. Conversely, the restriction upon movement of the candidate object identified by the candidate object ID module 230 is relatively low, e.g., substantial movement still allowed. In addition, the restriction upon movement of the candidate object identified by the candidate object ID module 230 may be relatively medium, e.g., the restriction upon movement is between relatively high restriction upon movement and relatively low restriction upon movement.

Each of the components of system 200 will now be described in more detail. As noted previously, the sensor 210 may receive input from the user through the user contacting, touching, or, more generally, engaging the detector 212.

The detector 212 may be made up of an array of detection points distributed over a two-dimensional sensing area. In some implementations, the detection points are evenly distributed in two dimensions over the sensing area. In this instance, the detector 212 may be shaped like a square or a rectangle, depending on whether the number of horizontal detection points equals the number of vertical detection points. In other implementations, the detector 212 may be shaped like a parallelogram. Each detection point in the detector 212 may receive input directly from one or more user input mechanisms (e.g., a user finger and/or a stylus) interacting with the multi-touch display. Detection points can be, for example, capacitive-based or FTIR-based. Measurements may be generated for each detection point, and, in some implementations, a measurement value may be produced for each detection point in the detector 212, irrespective of whether that detection point is or is not currently being engaged by the user. Notably, when there is no user engagement with a detection point, the measurement value for the detection point may be set to a zero value or to whatever value has been assigned by the system 200 as corresponding to no touch (i.e., a baseline value). As previously stated, in some implementations, direct physical contact between an input mechanism and the detector 212 may not be required to generate a touch. For example, in some implementations, if an input mechanism is hovering over the detector 212 (e.g., within 10 mm of the surface of the detector 212), the sensor 210 may detect a small change in capacitance or other measurable characteristic of the detector 212 at the detection points under the hovering input mechanism and may identify the existence of a touch by the input mechanism at the location of these detection points based on this detected small change.

In one implementation, the sensor 210 may be a capacitive touch sensor that includes circuitry to determine the locations of user inputs on the detector 212 by detecting changes in conductor capacitances caused by the one or more input mechanisms used by the user to engage the detector 212. The detector 212 may, for example, be a sensor matrix made up of a first group of conductors that are positioned substantially parallel to each other and a second group of conductors that are positioned substantially parallel to each other, where each of the conductors in the first array is positioned to intersect with every conductor in the second array and, vice versa, to thereby form a matrix. Each of the intersections between a conductor in the first array and a conductor in the second array may be a detection point of the detector 212. Through use of interpolation techniques, the number of detection points in the detector 212 may exceed the number of conductor intersections and the pitch of the detection points may be greater than the pitch of the conductor intersections.

The one or more user input mechanisms may, for example, be fingers or styluses and may engage the detector 212 by directly physically contacting one or more of the conductors in the sensor matrix or by otherwise hovering in close physical proximity to the one or more conductors (e.g., within 10 mm from the surface of the one or more conductors) such that a detectable change in capacitance at the detection points of the detector 212 occurs. For example, a user may engage the detector 212 by positioning a finger in close physical proximity to the detector 212, thereby causing the capacitance at the detection points of the detector 212 that are located at the center of the user's finger to deviate from a baseline value by, for example, 10 femtofarads for the detection points located at the center of the user's finger and 1 femtofarad for the detection points located at the edge of the user's finger.

The sensor 210 may include circuitry configured to generate and output a raw bitmap of measurement values associated with the user's input. In some implementations, the raw bitmap includes a measurement value (e.g., a value indicative of a measured capacitance) for each detection point in the detector 212. As noted above, a baseline measurement value (e.g., zero or a predetermined number greater than zero) may be included in the raw bitmap for each of the detection points that is not currently being engaged/touched by the user. Measurement values deviating from this baseline value by a predetermined amount may indicate detection of a user engagement at the corresponding detection point. For example, the sensor 210 may detect user engagement in the middle of the detector 212, and may output a corresponding bitmap array that includes baseline measurement values for the detection points located at the edge of the detector 212 that are not currently being engaged by the user and additionally includes values that deviate from the baseline values for the detection points located at the middle of the detector 212 that are currently being engaged by the user. In other implementations, the sensor 210 only provides data for those detection points having measurement values that deviate from the baseline values by the predetermined amount. As described in further detail below, the raw bitmap data may be used to identify the location or locations in the detector 212 where the user has touched or engaged the multi-touch display purposefully (i.e., with the intention of using the engagement or touch to control the multi-touch display application) and the location or locations in the detector 212 where the user has touched or engaged the multi-touch display incidentally (i.e., without the intention of using the engagement or touch to control the multi-touch display application).

In some implementations, the sensor 210 may include multiple detectors 212. For example, the sensor 210 may include a first detection grid to detect capacitive objects which contact or hover near the sensor 210 and may further include a second detection grid to detect an active (or passive) stylus. In this instance, the second detection grid may be designed to sense the active (or passive) stylus and thus output the location of the active (or passive) stylus. The first detection grid may operate independently of the second grid such that its operation remains identical irrespective of whether the second grid is included or is not included in the sensor 210. The first grid may sense touches, for example, with human skin and other conductive items when using capacitive sensing and with any physical object when using FTIR sensing.

The stylus detector module 222 is configured to detect the location of a stylus (or, more particularly, a stylus tip) on the detector 212. As previously discussed, this sensing of the stylus can either be accomplished through use of a second detection grid that is dedicated to identifying an active stylus or can be accomplished through use of a single detection grid that detects a passive stylus. In the implementation involving the passive stylus, the stylus detector analyzes the bitmap array output from the sensor 210 and identifies the location of the stylus by identifying a blob indicated by the bitmap array that closely matches the precise shape of the stylus tip. For example, in the case of a capacitive sensing sensor 210, the passive stylus may produce a blob having a small, round shape having dimensions roughly corresponding to the metal tip of the stylus. Notably, because the shape of the tip of the stylus is fixed and the material used to form the tip of the stylus is also fixed, the stylus produces a predictable change in capacitance when engaging the detector 212 and, therefore, is more easily detected and distinguished from other types of touches/contacts on the detector 212. The stylus detector module 222 may analyze the bitmap array and may identify one or more blobs that exhibit the characteristics known to correspond to a stylus touch. In the case of an FTIR sensor 210, the passive stylus also likely has a small round tip. The stylus detector module 212 may analyze the bitmap array and may determine the location of the stylus by identifying a blob having a shape that matches the shape of the small round tip. In the implementation that uses an active stylus, the second detection grid may output its own bitmap array (or portion of a bitmap array), and the stylus detector module 222 may analyze the second bitmap array to identify a touch that corresponds to the location of the tip of the active stylus. In some implementations, the bitmap array generated by the second detection grid does not identify or otherwise include data corresponding to touches other than the active stylus touch.

The touch detector module 224 is configured to identify touches, i.e., contiguous area of contact (or, more generally, engagement), based on the data in the bitmap array produced by the sensor 210. One technique that the touch detector module 224 may use to identify contiguous areas of contact (or, more generally, engagement) is touch tracking. For example, if a user places a hand, one fingertip, and a forearm on the sensor 210, then the touch detector module 224 may identify three different contiguous contact areas or touches, one for the fingertip, one for the palm region of the hand, and one for the forearm. In implementations in which a passive stylus is used, the touch detector module 224 also may identify a contiguous contact area as corresponding to the passive stylus. The touch detector module 224 may identify the contiguous contact areas by analyzing the bitmap array to identify detection points having measurements above a certain threshold. In some implementations, the threshold is zero. In other implementations, the threshold may be a non-zero baseline value. Each contiguous area or touch may be given a distinguishing label and may be packaged as data that identifies a particular subset of the detection points of the detector 212, where each detection point corresponds to a point of contact and is adjacent to each other detection point within the subset. For example, if there are three contiguous areas identified by the touch detector module 224, then one may include 153 detection points and may be labeled "A," the second may include 53 detection points and may be labeled "B," and the third may include 640 detection points and may be labeled "C." By processing the touches further using the touch detector module 224, the system 200 may determine which touches likely correspond to resting body part inputs and which touches likely correspond to pointing inputs.

In some implementations, the system 200 may analyze the values in the bitmap array received from the sensor 210 to distinguish a relatively large and irregular contiguous contact area that results from one or more fingertips engaging the detector 212 from a relatively large and irregular contiguous contact area that instead results from a resting arm or palm engaging the detector 212. For example, the touch detector module 224 may conclude that a large and irregularly shaped touch is not a resting body part input (e.g., an input arising from the resting of a palm, a forearm, an elbow or another relatively large body part) by comparing the values in the bitmap array corresponding to the area to a threshold value. Since the purposeful contact made with a pointing input (e.g., an input made by a fingertip) on the detector 212 is likely firmer (e.g., exhibits greater pressure or weight over more of its contact area) than that made by a resting body part input, the capacitance change generated by the pointing input may be greater than that generated by the unpurposeful resting body part input. As such, if the values corresponding to the blob are greater than a threshold value, for example, the touch detector module 224 may conclude that the touch does not correspond to a resting body part input, despite its irregular and larger shape. Conversely, if the values corresponding to the touch are less than a threshold value, then the touch detector module 224 may conclude that the touch corresponds to a resting body part input. In some implementations, a total capacitance corresponding to the blob is sensed by the detector 212. In these implementations, the total capacitance over an entire contact area of the blob may be generally higher for larger, but weaker, areas of the resting body part input. For example, measuring the total capacitance corresponding to the blob provides for a pressure threshold versus force threshold and may assist in identifying the resting body part input.

In some implementations, the system 200 is configured to restrict movement of virtual objects based upon a type of input received at the sensor 210. For example, the system 200 may be configured to identify and restrict virtual objects based upon determining, by the detector module 220, whether the input (either contact or hovering) is from a stylus. If the input is determined, by the detector module 220, to be from a stylus (either contacting or hovering), then the candidate object ID module 230 can identify that the virtual object located beneath the stylus input to be included in a subset of the virtual objects as candidates for movement restriction. In addition, the detector module 220 can detect a time-based window, such as less than one second, in which the stylus has ceased to provide the contact/hovering input. In this way, the candidate object ID module 230 can identify that the virtual object located beneath the stylus during the time-based window to be included in a subset of the virtual objects as candidates for movement restriction.

In some examples, the system 200 is configured to restrict movement of virtual objects based upon a location of the stylus input (either contact or hovering) with respect to locations of the virtual objects. In these examples, distances from the stylus input to the multiple virtual objects displayed within the canvas are determined and compared to a threshold. Then, based upon the comparison, a subset of the multiple virtual objects that are located within the threshold of the stylus are determined as candidates for movement restriction.

In some implementations, the system 200 is configured to determine a designated alteration area corresponding to the subset of the multiple virtual objects selected as candidates for movement restriction. For example, upon detection of a stylus, the subset of virtual objects displayed within the designated alteration area may be subject to locking (e.g., high-level movement restrictions), whereas objects outside of the designated alteration area may be subject to no movement restrictions. In addition, some or all of the objects outside of the designated alteration area may be subject to the same movement restrictions as those of the subset of objects displayed within the designated alteration area. Furthermore, some of the subset of virtual objects display within the designated alteration area may be subject to limited movement restrictions (e.g., mid-level movement restrictions), as compared to some other of the subset of virtual objects displayed within the designated alteration area. Accordingly, when a user is interacting with a virtual object using a stylus, such as editing a word processing document, inadvertent touch contact on the virtual object by the user, such as contact made by a palm, does not affect undesired changes to the word processing document. Similarly, inadvertent touch contact by the user on other virtual objects different from than the virtual object being interacted with using the stylus do not affect undesired changes to the other virtual objects.

In some implementations, the system 200 is configured to determine a hierarchical relationship of the subset of the multiple virtual objects corresponding to the subset of the multiple virtual objects selected as candidates for movement restriction. For example, a first grouping of virtual objects of the subset of multiple virtual objects selected as candidates for movement restriction may be subject to a first level of movement restriction based upon a type of virtual object each of the first grouping includes, whereas a second grouping of virtual objects of the subset of multiple virtual objects selected as candidates for movement restriction may be subject to a second level of movement restriction based upon a type of virtual object each of the second grouping includes, which differs from the first level of movement restriction.

Consider a situation in which a virtual page and another virtual object (e.g., a virtual ruler) are positioned on a canvas. In this situation, the canvas has a hierarchical relationship to both the virtual page and the other object (e.g., the virtual ruler) because movement of the canvas necessarily and directly causes movement of both the virtual page and the other object (e.g., the virtual ruler). The other object (e.g., the virtual ruler) has a spatial relationship to the virtual page because movement of the other object (e.g., the virtual ruler) only causes movement of the virtual page when the movement of the other object (e.g., the virtual ruler) causes the other object (e.g., the virtual ruler) to contact the virtual page. Based on the hierarchical relationship of the canvas to the virtual page and the spatial relationship of the other object (e.g., the virtual ruler) to the virtual page, the system 200 may perform a first type of movement restriction to the canvas and a second type of movement restriction to the other object (e.g., the virtual ruler) when the system 200 identifies the virtual page as a candidate for restriction. For example, the system 200 may determine to lock the virtual page based on detection of a stylus writing on the virtual page. In this example, the system 200 also may detect the hierarchical relationship of the canvas to the virtual page and also lock the canvas based on the hierarchical relationship. In addition, the system 200 may detect the spatial relationship of the other object (e.g., the virtual ruler) to the virtual page and, when the other object (e.g., the virtual ruler) is within a threshold distance of the virtual page, increase inertia (e.g., reduce the responsiveness to touch input without fully restricting movement) of the other object (e.g., the virtual ruler) based on the spatial relationship.

In some implementations, although the subset of multiple virtual objects have been selected as candidates for movement restriction, one or more of the subset of multiple virtual objects may have different movement restrictions based upon a relative location from an input to the display device. For example, one or more of the subset of multiple virtual objects may have a first movement restriction based upon a first relative location from a stylus input, whereas one or more of the subset of multiple virtual objects may have a second movement restriction based upon a second relative location from a touch input.

In some implementations, the system 200 is configured to determine positions of each of the multiple virtual objects relative to the stylus input corresponding to the subset of the multiple virtual objects selected as candidates for movement restriction. For example, when a user provides a stylus input in one region of a designated alteration area on the display device, virtual objects in another region of the designated alteration area can be restricted from movement. By determining positions of each of the multiple virtual objects relative to the stylus input, movement restrictions to the virtual objects can be determined based upon a threshold distance from the stylus input.

In some implementations, the system 200 is configured to determine object types of the multiple virtual objects corresponding to the subset of the multiple virtual objects selected as candidates for movement restriction. For example, movement of certain virtual objects, such as word processing documents, can be restricted at a first level, whereas movement of other virtual objects, such as digital photographs, can be restricted at a second level. By doing so, object types of the virtual objects can be used to selectively restrict movement.

FIGS. 3, 4, 7, 10, 12, 14, 16, and 18 illustrate example processes. The operations of the example processes are described generally as being performed by the system 200. The operations of the example processes may be performed by one of the components of the system 200 (e.g., the candidate object ID module 230, the movement restriction module 240, etc.) or may be performed by any combination of the components of the system 200. In some implementations, operations of the example processes may be performed by one or more processors included in one or more electronic devices.

Figure 3:
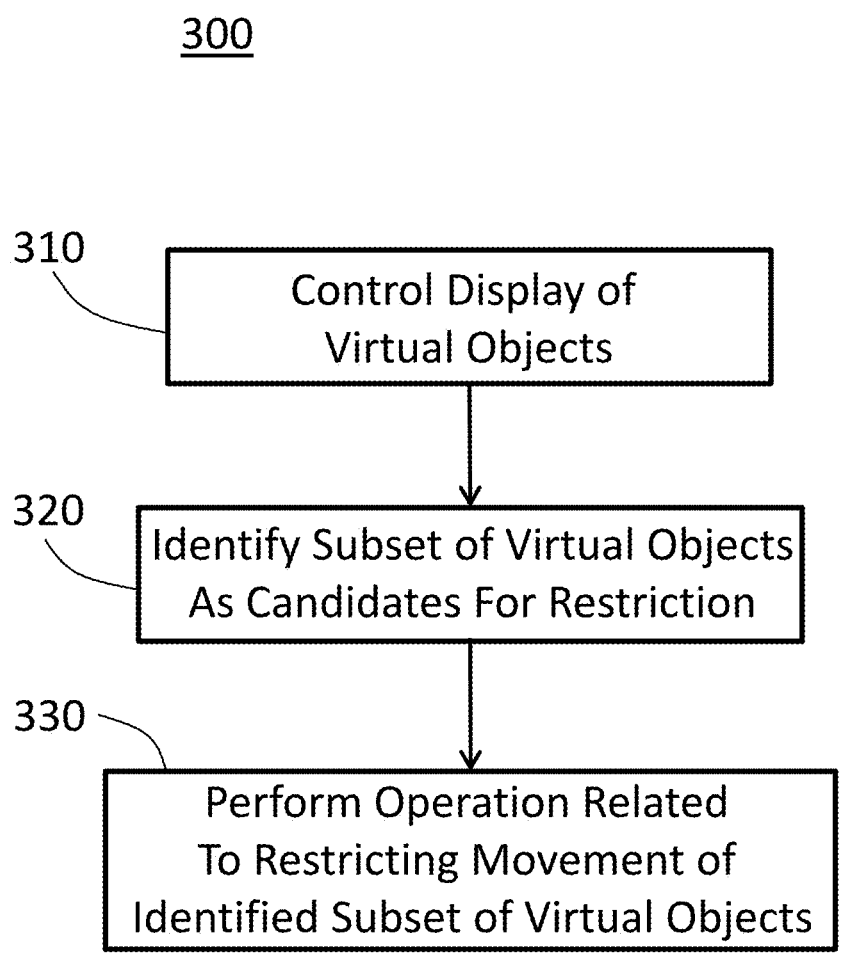
FIG. 3 is a flowchart of an example process for controlling manipulation of displayed objects.

FIG. 3 illustrates an example flowchart of controlling manipulation of displayed virtual objects. In FIG. 3, the system 200 controls the display of multiple virtual objects (310). In some implementations, each of the multiple virtual objects is capable of movement based upon a first type of input and being capable of alteration based on a second type of input that is different from the first type of input. For example, applications that display objects can update the displayed objects based upon an input or type of input provided to the displayed objects. For document-type applications, a writing application with virtual pages can display the virtual pages and then update the displayed virtual pages based upon writing input provided to the displayed virtual pages. For artistic-type applications, a drawing application with a virtual easel can display and update the virtual easel based upon drawing input provided to the displayed virtual easel. Similarly, a virtual sculpting application with a virtual clay block can display and update the virtual clay block based upon sculpting input provided to the displayed virtual clay block. For medical-type applications, a surgical application with a virtual patient can display and update the virtual patient based upon surgical input provided to the displayed virtual patient. In each of these applications, alteration of the virtual objects may occur through stylus input and movement of the virtual objects may occur through touch input.

The system 200 identifies a subset of the multiple virtual objects as candidates for restriction (320). In some implementations, the system 200 identifies the candidates for restriction based on explicit user input to select the candidates. In addition, the system 200 may identify the subset as candidates for restrictions based on a detected user input and a state of the system.

Figure 4:
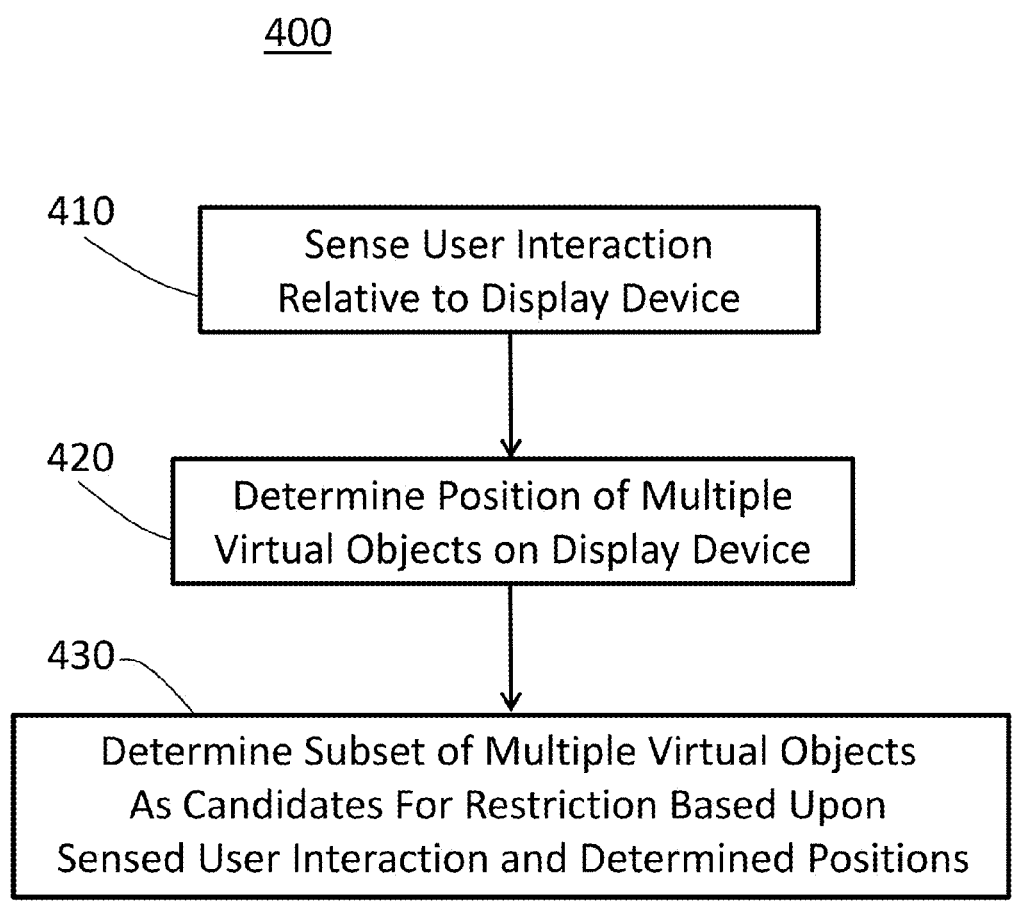
FIG. 4 is a flowchart of an example process for identifying displayed objects as candidates for restriction.

FIG. 4 illustrates an example process 400 for identifying displayed virtual objects as candidates for restriction. The process 400 may be used in identifying a subset of the multiple virtual objects as candidates for restriction referenced above with respect to reference numeral 320.

The system 200 senses a user's interaction relative to a display device (410). In some implementations, the user's interaction includes providing input using a stylus or body part (either contact or hovering) at a location on the display device corresponding to one or more virtual objects. Next, the system 200 determines positions of multiple virtual objects displayed on the display device (420). In some implementations, the system 200 determines positions of the multiple virtual objects displayed on the display device by accessing location information from the application which generates the multiple virtual objects. Then, based upon the sensed user's interaction relative to the display device and the determined positions of the multiple virtual objects, the system 200 determines a subset of the multiple virtual objects as candidates for restrictions (430). For example, the system 200 may compare a location the sensed user interaction to the positions of the multiple virtual objects and determine the subset of the multiple virtual objects based on the comparison. In this example, the sensed user interaction may be a stylus input and the system 200 may identify a virtual object that is being contacted by the stylus or that is directly under a hovering stylus as a candidate for restriction. In addition, the system 200 may evaluate the positions of the multiple virtual objects relative to the position of the stylus input and identify those virtual objects that are positioned within a threshold distance of the stylus input as candidates for restriction.

In some examples, the sensed user interaction may be touch input. In these examples, the system 200 may evaluate the type of touch input provided and determine whether the touch input indicates that the user is entering a position for altering a virtual object. The system 200 may detect the user entering a position for altering a virtual object based on detecting the user resting forearms on the sensor 210 in an orientation that is typical of a user that is altering a virtual object (e.g., detecting the user entering a writing pose). Based on a determination that the touch input indicates that the user is not entering a position for altering a virtual object, the system 200 may not restrict movement of the multiple virtual objects and may continue monitoring sensed user interactions relative to positions of the multiple virtual objects. Based on a determination that the touch input indicates that the user is entering a position for altering a virtual object, the system 200 may evaluate the positions of the multiple virtual objects relative to the position of the touch input and identify virtual objects as candidates for restriction based on the evaluation. For instance, the system 200 may identify those virtual objects that are located in an area where a user would typically alter a virtual object when oriented in the detected position of the touch input. When the system 200 detects the user entering a writing pose, the system 200 may identify a virtual object as a candidate for restriction when the virtual object is located centrally between two resting forearms.

Figure 5:
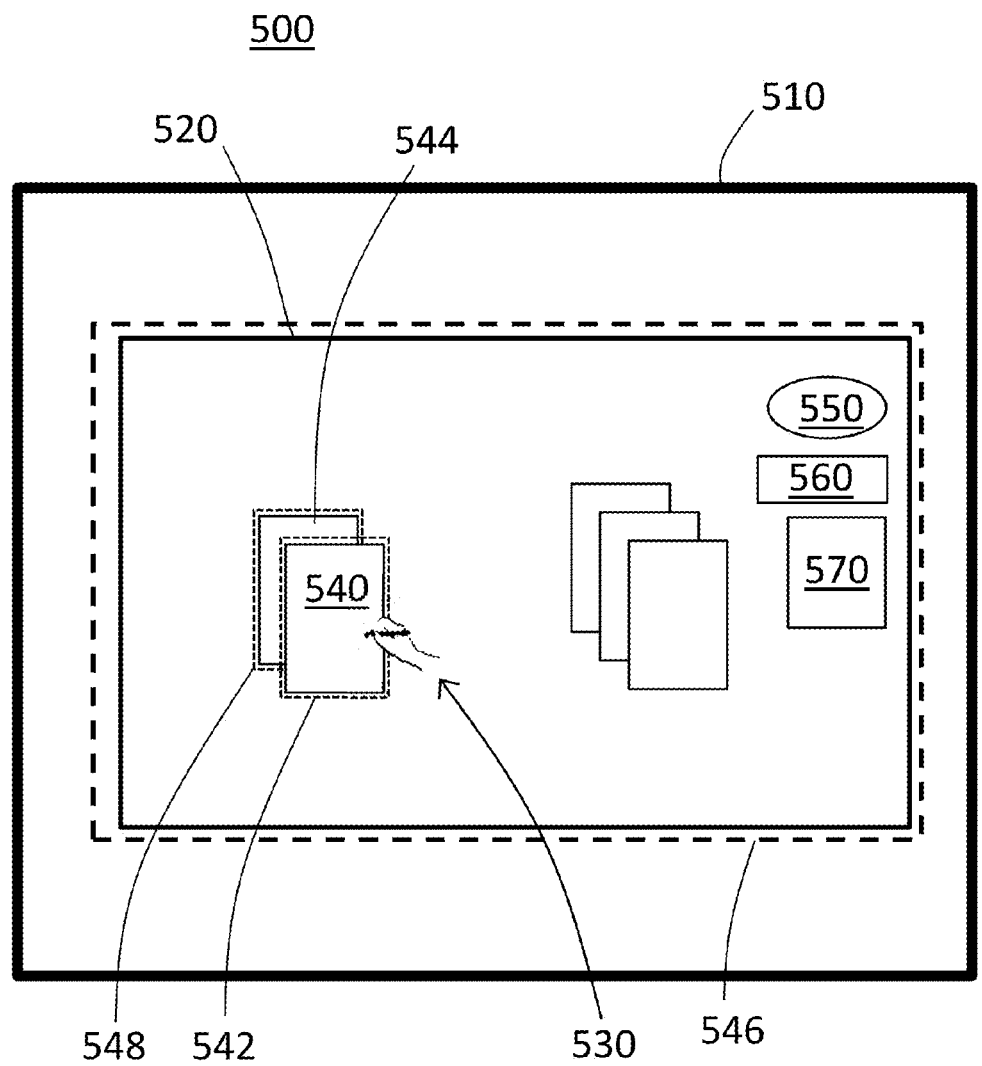
FIG. 5 is a diagram of an example display system configured to hierarchically control manipulation of displayed objects.

FIG. 5 illustrates an example display system 500 configured to hierarchically control manipulation of displayed objects. The system 500 may use techniques described above with respect to the process 400 to identify virtual objects as candidates for restriction.

In FIG. 5, the system 500 includes a display device 510 having a canvas 520. The system 500 detects a user's interaction 530 within the canvas 520. In this implementation, the user's interaction 530 includes input (either contact or hovering) from a stylus overlying a virtual object 540. Upon detecting the user's interaction 530 overlying the virtual object 540, the system 500 highlights the virtual object 540 with a highlight display element 542. In addition, the system 500 determines that the canvas 520 is hierarchically related to the virtual object 540 and movement of canvas 520 causes movement of the virtual object 540. Further, the system 500 determines that the virtual object 540 is part of a stack of virtual objects and, thus, hierarchically related to other virtual objects 544 that are part of the stack and whose movement would cause movement of the virtual object 540. Based on the hierarchical relationship to the canvas 520 and the other virtual objects 544, the system 500 identifies the canvas 520 and the other virtual objects 544 as candidates for restriction, even though the canvas 520 and the other virtual objects 544 would not otherwise be identified as candidates for restriction based on the sensed user interaction. Based on the identification of the canvas 520 and the other virtual objects 544 as candidates for restriction, the system 500 highlights the canvas 520 with a highlight display element 546 and highlights the other virtual objects 544 with a highlight display element 548. The virtual objects 550, 560, and 570 are not highlighted as each of the virtual objects 550, 560, and 570 does not have hierarchical relationship to the virtual object 540 and are not identified as candidates for restriction based on the sensed user interaction. Based upon the user's interaction 530, the virtual objects 540 and 544 and the canvas 520 are highlighted to indicate to the user that the virtual objects 540 and 544 and the canvas 520 have restricted movement. In other words, based upon the user's interaction 530, the virtual objects 540 and 544 and the canvas 520 are determined to be a subset of the multiple virtual objects displayed within the canvas 520 that are candidates for movement restriction. Accordingly, the user's interaction 530 may effectively lock (or significantly reduce) movement of the virtual objects 540 and 544 and the canvas 520 (the "subset"), without locking (or changing) movement responsiveness of the virtual objects 550, 560, and 570.

In some implementations, locking of the subset (the virtual objects 540 and 544 and the canvas 520) of the multiple virtual objects 520, 540, 544, 550, 560, and 570 allows for movement of the virtual objects 550, 560, and 570, but does not allow movement (or greatly restricts movement) of the subset of the multiple virtual objects. For example, while the user's interaction 530 is maintained with respect to the virtual object 540, touch input provided to the virtual objects 550, 560, and 570 causes movement of the virtual objects 550, 560, and 570, but touch input provided to the virtual objects 540 and 544 and the canvas 520 does not cause movement of the virtual objects 540 and 544 and the canvas 520.

Figure 6:
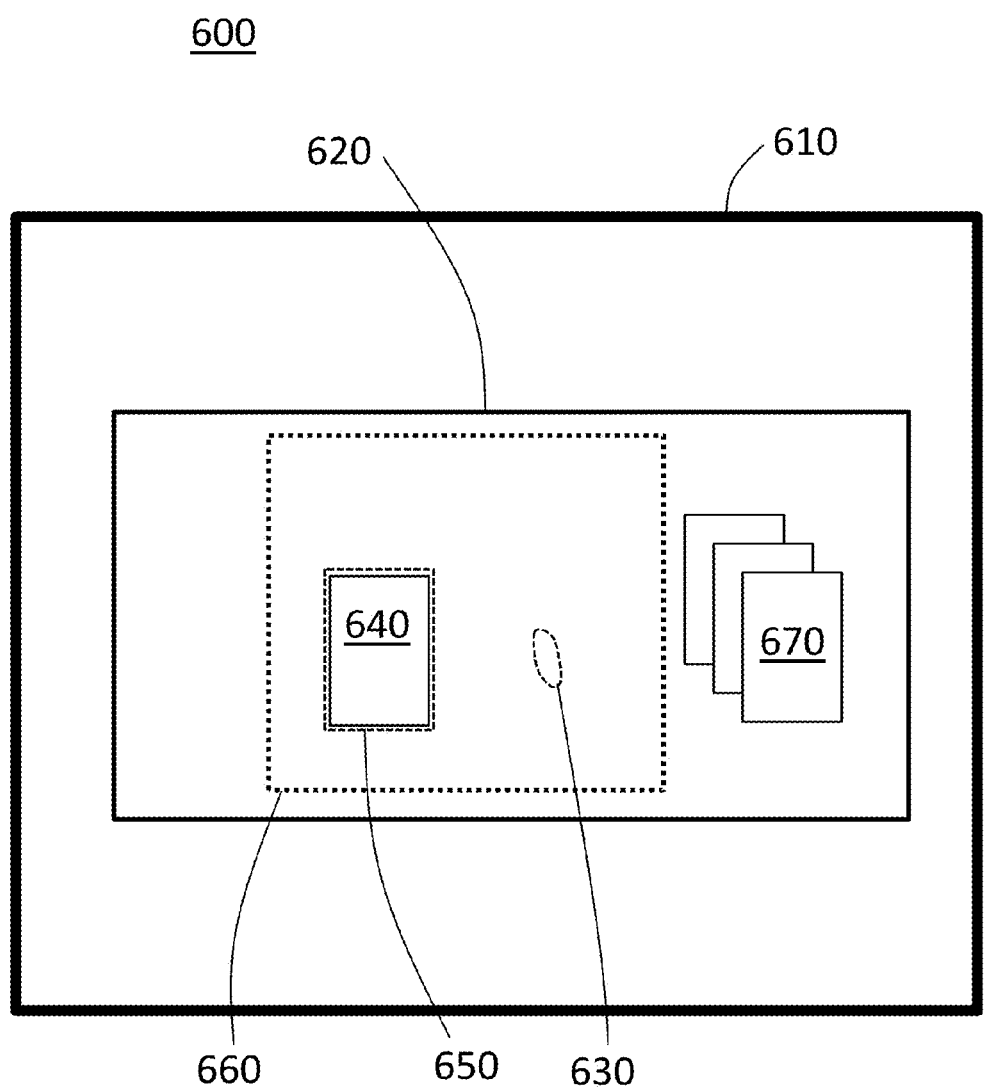
FIG. 6 is a diagram of an example display system configured to control manipulation of displayed objects based upon a detected user writing position.

FIG. 6 illustrates an example display system 600 configured to control manipulation of displayed objects based upon a detected user writing position. The system 600 may use techniques described above with respect to the process 400 to identify virtual objects as candidates for restriction.

In FIG. 6, the system 600 includes a display device 610 having a canvas 620. The system 600 detects a user's interaction 630 within the canvas 620. In some implementations, the system 600 detects that the user's interaction 630 has a defined blob-shape particular to a user's forearm or elbow. For example, in contrast to a touch contact by a user's finger, the user's interaction 630 has a more oblong geometry, and has an area substantially larger than an area corresponding to a user's fingertip, as well as a stylus tip.

In some examples, the system 600 detects that the user's interaction 630 is located between virtual objects 640 and 670 and each could potentially be candidates for restriction. However, because the system 600 detects that the virtual object 640 is located within a designated writing area 660 and that the virtual object 670 is outside of the designated writing area 660, the system 600 highlights the virtual object 640 with a highlighted display element 650 indicating that the user is preparing to modify the virtual object 640 and does not highlight the virtual object 670. In some implementations, the designated writing area 660 is determined by an application which is generating the virtual objects 640 and 670. For example, a graphical document application generating the virtual objects 640 and 670 designates a central region of the canvas 620 as the designated writing area 660.

In the example shown in FIG. 6, the positions of the virtual objects 640 and 670 relative to the designated writing area 660 are used as input for the system 600 to identify candidates for restrictions. In this example, the system 600 determines that the virtual objects 640 and 670 are equally likely to be candidates for restriction based on the user's interaction 630, but identifies only the virtual object 640 as a candidate for restriction based on the determination that it is within the designated writing area 660 and the virtual object 670 is not.

In this instance, the detector module 220 of the system 200 (in FIG. 2) may further include a blob detector module configured to receive output of the sensor 210 and determine whether the contact input provided to the sensor 210 is detected to correspond to a blob (i.e., a contact area corresponding to the shape of a user's forearm or elbow). In some implementations, the blob detector module is configured to include a blob footprint model, such as a bitmap, and to compare the output from the sensor 210 with the blob footprint model. If the blob detector module makes a determination, based upon the comparison between the output of the sensor 210 and the blob footprint model, that the output of the sensor 210 corresponds to a blob, then output from the detector module 220 indicates that the contact received by the sensor 210 corresponds to a blob and the location of the blob contact input. Then, in this instance, the candidate object ID module 230 can be further configured to access the location of the blob input, and determine the positions of the virtual objects displayed on the display device. Then, the candidate object ID module 230 can use the location of the blob input, and the positions of the virtual objects to identify ones (i.e., a subset) of the virtual objects as candidates for restriction. In some implementations, the candidate object ID module 230 can determine (or access) the positions of the virtual objects from the application generating the virtual objects displayed on the display device.

Figure 7:
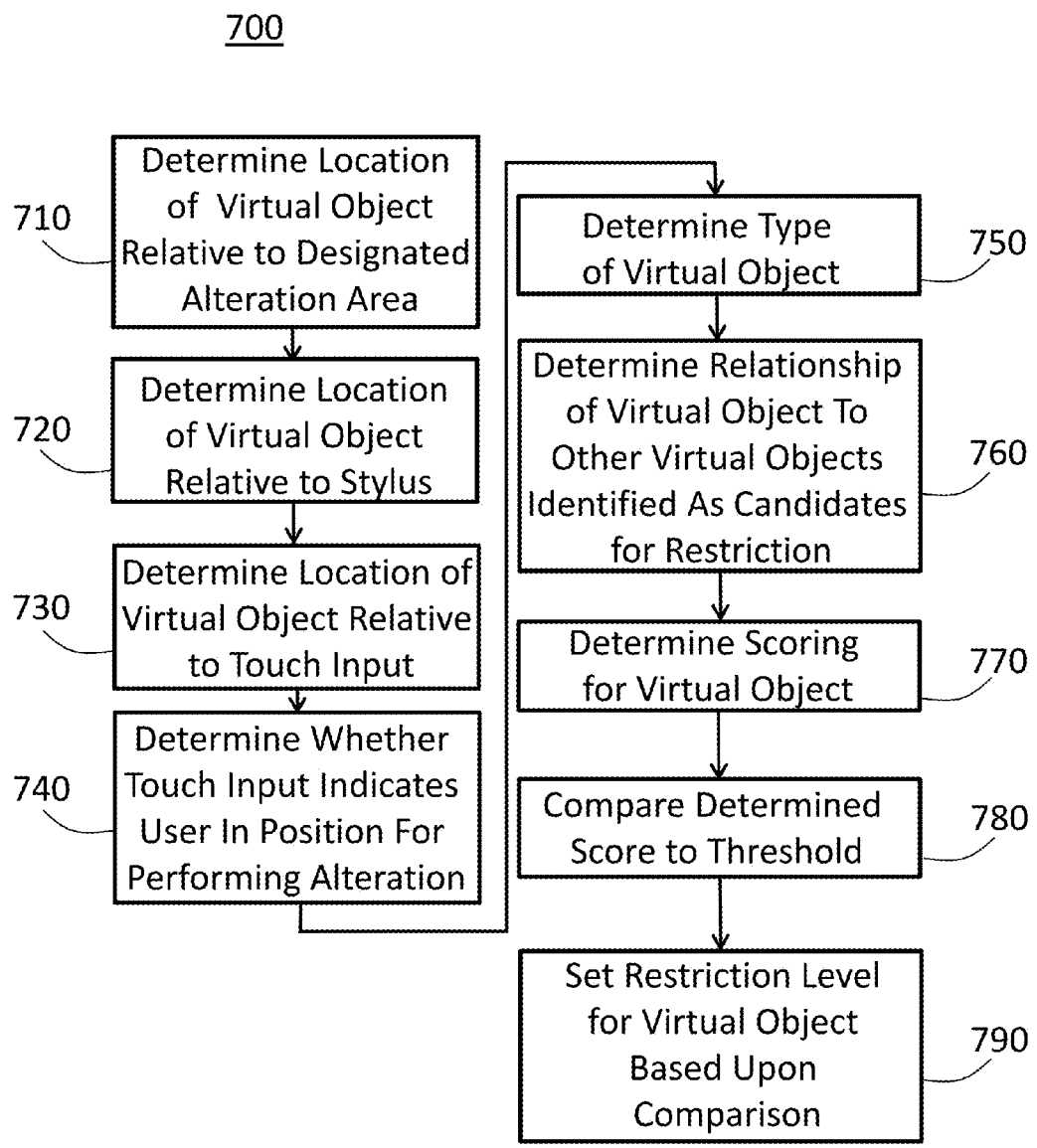
FIG. 7 is a flowchart of an example process for classifying displayed objects.

FIG. 7 illustrates an example process 700 for classifying displayed objects. The process 700 may be used in determining a subset of the multiple virtual objects as candidates for restrictions referenced above with respect to reference numeral 430.

In FIG. 7, the system 200 computes a score for a particular virtual object included in multiple virtual objects. The process 700 may be used to compute a score for each virtual object displayed and set a restriction level for each virtual object. The system 200 determines a location of a particular virtual object displayed on a display device relative to a designated alteration area (710). In some implementations, the designated alteration area exists within a region less than an entirety of the display device and the system 200 determines whether the particular virtual object is located in the designated alteration area. For instance, a painting application may have a virtual easel that defines a designated painting area where a virtual paper is placed when the user is painting on the virtual paper. Other areas of the painting application may include an area for a virtual palette of paint colors, an area for storage and selection of virtual paint brushes, and a storage area for storage of completed paintings. Because painting occurs in the designated painting area, the system 200 is more likely to identify objects located in the designated painting area as candidates for restriction than objects located outside of the designated painting area.

The system 200 makes a determination regarding the location of the particular virtual object displayed on the display device relative to a location of a stylus input (720). In some implementations, the stylus input includes a contact stylus input, and in other implementations, the stylus input includes a hovering stylus input. The system 200 may determine whether the particular virtual object is located directly under the stylus input or within a threshold distance of the stylus input.

The system 200 makes a determination regarding the location of the particular virtual object displayed on the display device relative to a touch input sensed by a detection unit associated with the display device (730). In some implementations, the touch input is provided as an input distinct from a single fingertip touch input. For example, a grouped three- or four-fingertip contact input can be provided adjacent to (or at a predetermined distance from) a particular virtual object. In this example, the system 200 determines whether the position of the particular virtual object relative to the grouped three- or four-fingertip contact input suggests that the particular virtual object is about to be altered.

The system 200 makes a determination whether the touch input sensed by the detection unit associated with the display device indicates that a user is in a position for performing alterations to the particular virtual object based on a second type of input (740). In some implementations, the determination is made that touch input is provided as a result of the user resting his or her forearm or elbow adjacent to (or at a predetermined distance from) the particular virtual object, e.g., in a position to write (or modify) the virtual object.

The system 200 makes a determination regarding the type of the particular virtual object (750). In some implementations, the system 200 determines that the particular virtual object is an editable word processing document, which is frequently altered, or determines that the particular virtual object is a read only word processing document, which is infrequently altered. In some examples, the system 200 determines that the particular virtual object is a digital photograph or a legal document, which is unalterable.

The system 200 makes a determination regarding a relationship of the particular virtual object with respect to other virtual objects that have been identified as candidates for restriction (760). In some implementations, determines whether the particular virtual object is largely related to the other virtual objects that have been identified as candidates for restriction, largely unrelated to the other virtual objects that have been identified as candidates for restriction, or slightly related to the other virtual objects that have been identified as candidates for restriction. The system 200 may determine the relationship in terms of type, kind, spacing, and/or format as the other virtual objects that have been identified as candidates for restriction. The system 200 also may determine whether the particular virtual object has a hierarchical relationship (e.g., parent or child) to another virtual object identified as a candidate for restriction. The system 200 further may determine the relationship based on how movement of the particular virtual object results in movement of the other objects identified as candidates for restriction.

The system 200 determines a score of the particular virtual object (770). In some implementations, scoring of the particular virtual object may be based upon different objectives. For example, some objectives for scoring the particular virtual objects includes object type, a location of the particular virtual object displayed on the display device relative to the designated alteration area, a location of the particular virtual object displayed on the display device with respect to the stylus, a location of the particular virtual object displayed on the display device relative to the touch input, the determination of whether the touch input indicates that the user is in a position for performing alteration, the type of the particular virtual object, and the relationship of the particular virtual object to any other virtual objects identified as candidates for restriction.

The system 200 makes a comparison between the scoring of the particular virtual object and a scoring threshold (780). In some implementations, the system 200 accesses multiple thresholds that define at least three levels of restriction. For example, three distinct scoring threshold ranges may be established in which each scoring threshold range is equally distributed. In another example, three distinct scoring threshold ranges may be established in which each scoring threshold range is weighted one more than another.

In some implementations, the scoring threshold comprises only a single, absolute range. For example, a single scoring threshold range may be established in which the scoring of the virtual object is either above or below the scoring threshold range. In some examples, comparing the computed scores to the thresholds includes comparing the computed scores to multiple thresholds that define at least three levels of restriction. In some implementations, determining the subset of the multiple virtual objects as candidates for restriction based on the comparison of the computed scores to the thresholds includes setting, for each of the multiple virtual objects and from among the at least three levels of restriction, a restriction level based on the comparison of the computed scores to the thresholds.

The system 200 sets a restriction level for the virtual object (790). In some implementations, the restriction level is set to indicate that a high level of restriction is placed upon the virtual object. For example, restriction levels of certain virtual objects can be changed en masse without the need to rescore individual virtual objects. In addition, the restriction level may be user selectable based upon the different types of virtual objects that are being altered. In some implementations, different restriction actions are taken for different restriction levels.

FIG. 8 illustrates example scoring weights and threshold scores used in classifying displayed objects. The example scoring weights and threshold scores may be used in the process 700 for scoring and setting restriction levels of virtual objects.

In FIG. 8, various scores are assigned to different modes of detection related to virtual objects. In some implementations, scorings have a substantially large range for different virtual object types. For example, scorings range from a low of −10 (corresponding to an unalterable virtual object, such as a legal document) through a mid-range of 0 or +0.2 (corresponding to virtual objects that are frequently or infrequently altered) to a high range of +10 (corresponding to virtual objects touched by a stylus). In this example, objects that have a high range detection are almost always identified as a candidate for restriction, whereas objects that have a low range detection are almost never identified as a candidate for restriction. Objects may need multiple mid-range detections to be identified as a candidate for restriction.

In some implementations, scorings is related to input type and input position. For example, scorings range from +0.2 (corresponding to touch inputs indicating that a user is in an alteration position) to −0.1 (corresponding to touch inputs that do not indicate that a user is in an alteration position). In addition, scorings is related to object location with respect to a stylus. For example, scorings range from +10 (corresponding to virtual objects touched by a stylus) to +0.8 (corresponding to virtual objects located directly beneath a hovering stylus) to +0.4 (corresponding to virtual objects within a threshold distance of a hovering stylus) to +0.3 (corresponding to virtual objects within a threshold distance of a touching stylus).

In some examples, scorings is based on hierarchical relationship to candidates for restriction. For example, scoring of a virtual object hierarchically related to a restriction candidate may be substantially the same as the score of the restriction candidate. Further, scoring of a virtual object unrelated to a restriction candidate is 0.

In some implementations, scorings are related to positions of virtual objects relative to touch inputs. For example, scoring of location of a virtual object relative to touch inputs suggesting that the user is in a position for altering the virtual object is +0.2, where the location of the virtual is centered between adjacent touch inputs, e.g., the virtual is located between touch contacts corresponding to the user resting his or her forearms or elbows on opposing sides of the virtual object. In another example, scoring of location of a virtual object relative to touch inputs suggesting that the user is not in a position for altering the virtual object is −0.2, where the location of the virtual is not between adjacent touch inputs, e.g., the virtual object is not located between touch contacts corresponding to the user resting his or her forearms or elbows on opposing sides of the virtual object, or the virtual object is very close to the one or more of the touch inputs. In actual implementations, the scoring system described may make use of machine learning based classifiers where various parameters would be determined by training the system with examples.

In FIG. 8, restriction levels are be assigned to threshold ranges. In some implementations, threshold ranges of less than 0.5 are assigned a restriction level of none. For example, virtual objects having relatively low assigned scores do not have restrictions. Threshold ranges of 0.5 to 1.0 may be assigned a restriction level of medium. For instance, virtual objects having a mid-range of assigned scores have slight restrictions ("Medium"). Threshold ranges of more than 1.0 may have a high restriction level. For example, virtual objects having a high range of assigned scores are highly restricted ("High").

In using the example scoring weights and threshold scores shown in FIG. 8 for scoring and setting restriction level of a virtual object, the system 200 compares each detection made for the virtual object to the types of detections stored in the left hand column of the uppermost table shown in FIG. 8. For each match, the system 200 accesses the assigned score corresponding to the matched detection and adds the assigned score to an overall score for the virtual object. The system 200 then compares the overall score to the threshold ranges shown in the lowermost table shown in FIG. 8 and sets the restriction level for the virtual object based on the comparison. For instance, if the system 200 detects the object within a threshold distance of a hovering stylus and detects that the object is located in a designated alteration area, the system 200 computes a score of +0.6 for the virtual object and sets the restriction level for the virtual object as "Medium" based on the overall score falling between +0.5 to +1.0.

Figure 9:
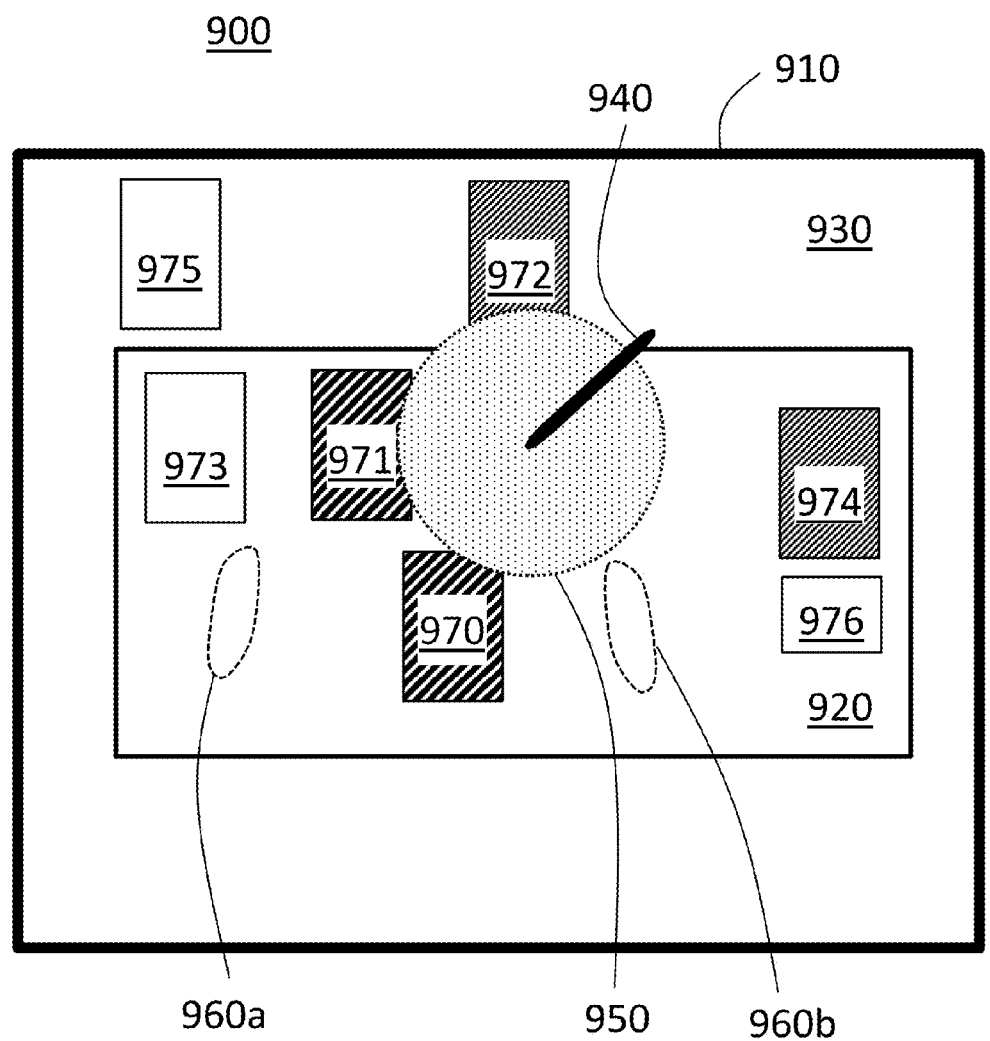
FIG. 9 is a diagram of an example display system configured to handle displayed Objects using multiple restriction levels.

FIG. 9 illustrates an example display system 900 configured to handle displayed objects using multiple restriction levels. The system 900 may use techniques described above with respect to the process 700 to set restriction levels for virtual objects.

In FIG. 9, the system 900 includes a display device 910 having an alteration area 920 within a canvas 930. Within the alteration area 920 are various virtual objects 970, 971, 973, 974, and 976. Outside of the alteration area 920, but within the canvas 930, are various virtual objects 972 and 975.

In FIG. 9, alteration positions 960a and 960b are shown adjacent to the virtual object 970. In some implementations, the alteration positions 960a and 960b have defined blob-shapes particular to a user's forearm or elbow. The alteration positions 960a and 960b may include contact of the user's forearm or elbow adjacent to the virtual object 970 indicating that the user is preparing to modify the virtual object 970. Since the virtual object 970 is centered between the alteration positions 960a and 960b, the system 200 determines that it is likely that the user is in position to alter the virtual object 970.

In FIG. 9, a hovering stylus 940 is shown overlying the alteration area 920, but not directly overlapping any of the virtual objects 970-976. A threshold distance 950 around the hovering stylus 940 overlaps the virtual objects 970, 971, and 972.

In the example shown in FIG. 9, the virtual object 970 is determined to have a high restriction level. Since the virtual object 970 is an object, such as a word processing document, that is frequently altered, is within a threshold distance 950 of the stylus 940, is centered between the alteration positions 960a and 960b, and is within an alteration area 920, the virtual object 970 is considered to have a high restriction score that meets a high restriction threshold. Similarly, the virtual object 971 is also determined to have a high restriction level. Since the virtual object 971 is also an object, such as a word processing document, that is frequently altered, is within a threshold distance 950 of the stylus 940, and is within an alteration area 920, the virtual object 971 is also considered to have a high restriction score that meets a high restriction threshold.

In some implementations, the virtual object 972 is determined to have a medium restriction level. Like the virtual object 971, the virtual object 972 is within the threshold distance 950 from the stylus 940 and is an object, such as a word processing document, that is frequently altered. However, the virtual object 972 is outside of the alteration area 920. Accordingly, the virtual object 972 is considered to have a medium restriction score that meets a medium restriction threshold.

The virtual object 973 is determined to have a low (e.g., no) restriction level. Although the virtual object 973 is positioned in the alteration area 920, the virtual object 973 is considered to have a low restriction score that meets a low restriction threshold because the virtual object 973 is a read-only type of virtual object, such as a legal document, that cannot be altered.

The virtual object 974 is determined to have a medium restriction level. Although the virtual object 974 is outside of the threshold distance 950 of the stylus 940, the virtual object 974 is within the alteration area 920 and is an object, such as a word processing document, that is frequently altered. Accordingly, the virtual object 974 is considered to have a medium restriction score that meets a medium restriction threshold.

The virtual object 975 is determined to have a low (e.g., no) restriction level. The virtual object 975 is outside of the threshold distance 950 of the stylus 940, is outside of the alteration area 920, and away from the alteration positions 960a and 960b. Accordingly, although the virtual object 975 is an object, such as a word processing document, that is frequently altered, the virtual object 975 is considered to have a low restriction score.

The virtual object 976 is determined to have a low (e.g., no) restriction level. Although the virtual object 976 is positioned in the alteration area 920 and is an object, such as a word processing document, that is frequently altered, the virtual object 976 is outside of the threshold distance 950 of the stylus 940, and is located at a position relative to the alteration positions 960a and 960b that suggests the virtual object 976 is unlikely to be written upon by the stylus 940 and unlikely to be dragged to a position to be written upon by the stylus 940 (e.g., outside of the alteration positions 960a and 960b with a direct path to the center of the alteration positions 960a and 960b that is blocked by the alteration position 960b). Accordingly, the virtual object 976 is considered to have a low restriction score that meets a low restriction threshold.

Referring again to FIG. 3, the system 200 performs an operation related to restricting movement of the determined subset of virtual objects (330). In some implementations, performing the operation related to restricting movement of the determined subset of virtual objects based on the first type of input comprises restricting, for the determined subset of virtual objects, movement that occurs based on the first type of input while enabling alteration of the determined subset of virtual objects based on the second type of input, the movement that occurs based on the first type of input for the determined subset of virtual objects being less than movement that occurs based on the first type of input for the multiple virtual objects that are excluded from the determined subset of virtual objects. For example, a stylus input to a virtual object of the subset of virtual objects allows for editing the virtual object, but establishes restrictions on translational and rotational movements. In addition, a touch input to the virtual object does not alter the restrictions established by the stylus input to the virtual object.

Figure 10:
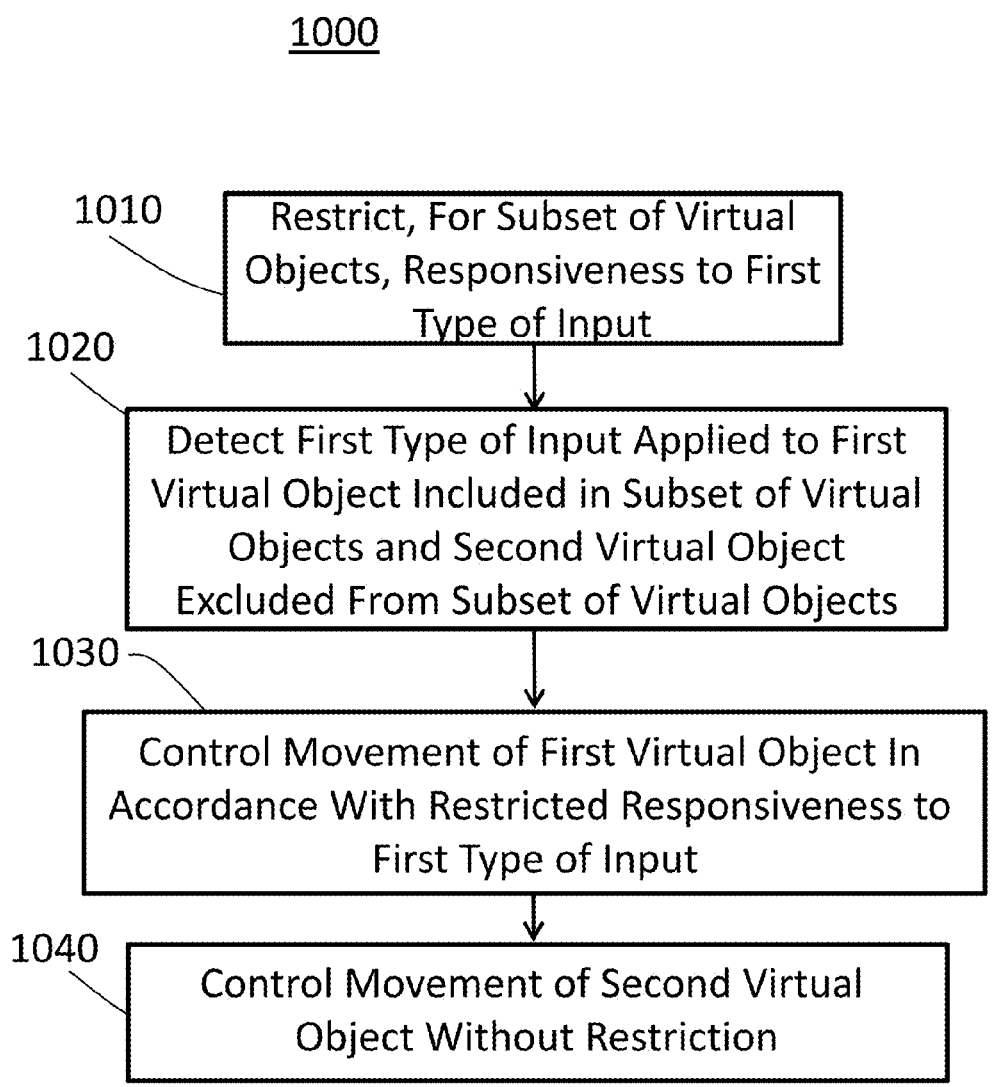
FIG. 10 is a flowchart of an example process for restricting movement of displayed objects.

FIG. 10 illustrates an example process 1000 for restricting movement of displayed objects. In FIG. 10, the system 200 restricts, for a subset of virtual objects, responsiveness to a first type of input (1010). In some implementations, the first type of input is touch input provided by a user's body part, such as a finger. In these implementations, the touch input causes movement of virtual objects and the system 200 restricts, for the subset of virtual objects, how the subset of virtual objects move in response to touch input.

The system 200 detects the first type of input applied to a first virtual object included in the subset and a second virtual object excluded from the subset of virtual objects (1020). In some implementations, detecting the first type of input includes use of a sensor and a detector module associated with the display device to detect touch input that is applied across the first virtual object and the second virtual object.

The system 200 controls movement of the first virtual object in accordance with a restricted responsiveness to the first type of input (1030). In some implementations, restricting, for the subset of virtual objects, responsiveness to the first type of input (e.g., touch input) includes locking the subset of virtual objects such that the subset of virtual objects are unresponsive to the first type of input. In these implementations, the system 200 ignores the first type of input applied to the first virtual object and maintains a position of the first virtual object despite the first type of input applied to the first virtual object. In other implementations, the system 200 may increase the inertia of the first virtual object such that the first virtual object still responds to the first type of input (e.g., touch input), but does not move as much in response to the first type of input.

The system 200 controls movement of the second virtual object without restriction (1040). For instance, because the second virtual object is excluded from the subset of virtual objects identified as candidates for restriction, the system 200 has not placed a restriction on movement of the second virtual object and the second virtual object moves normally (e.g., has a higher responsiveness to touch input than the first virtual object). Movement of the second virtual object may include translation, rotation, and scaling.

Figure 11A:
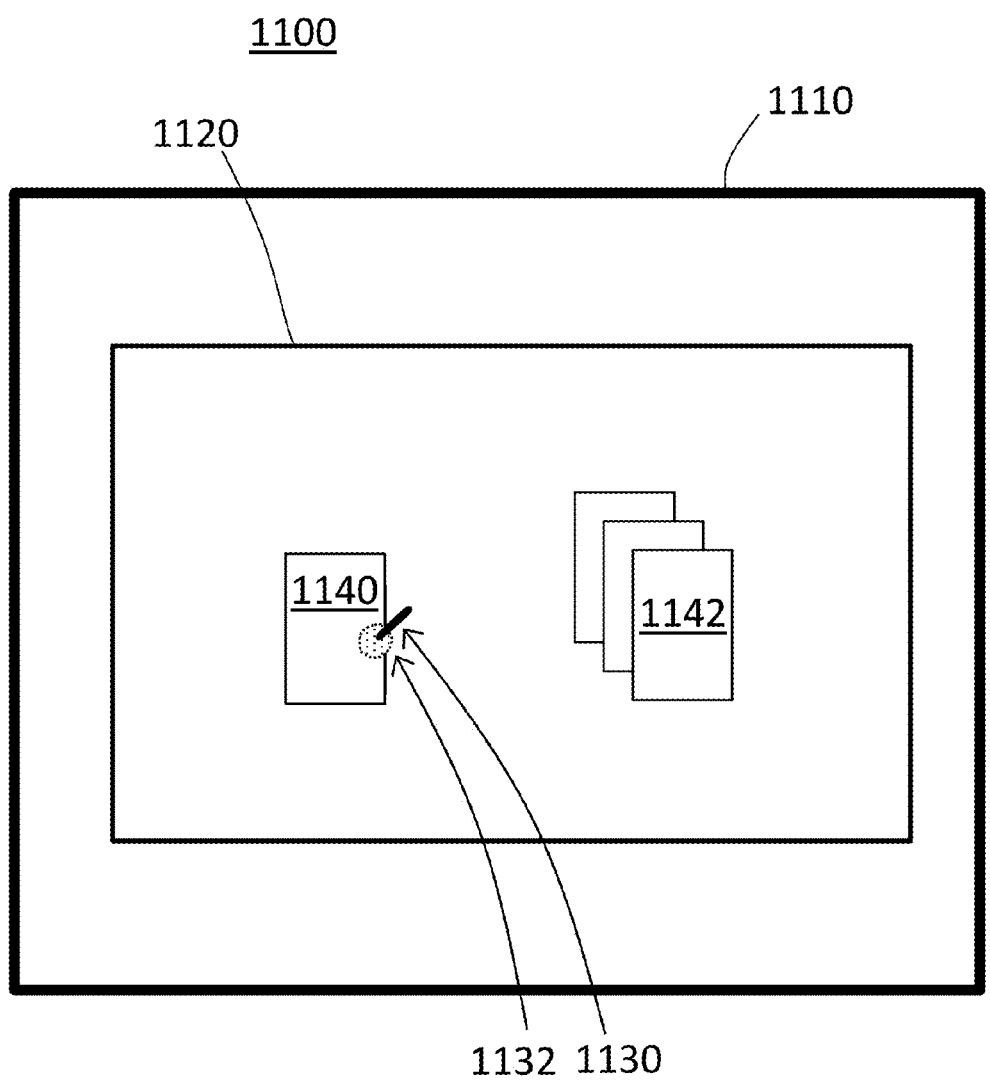
FIGS. 11A and 11B are diagrams illustrating example restriction responsiveness for displayed objects.
Figure 11B:
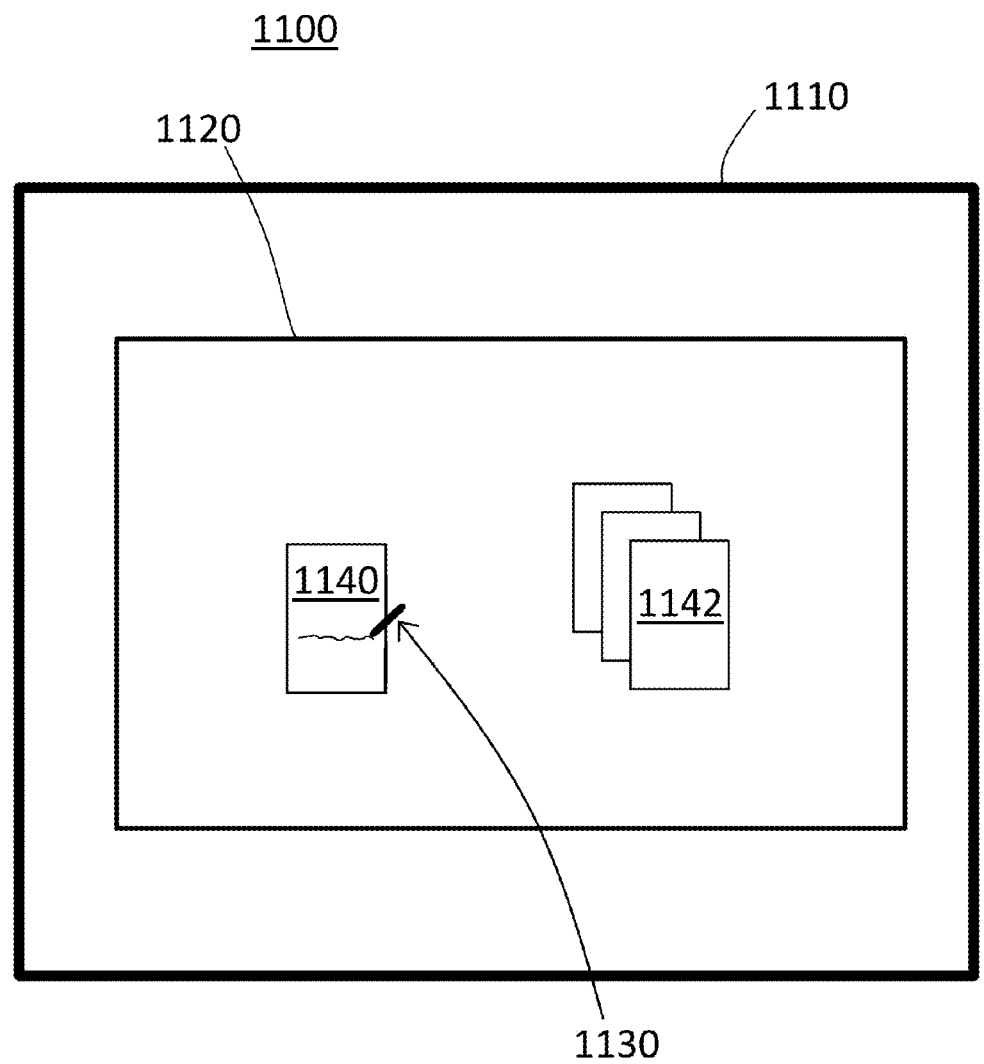

FIGS. 11A and 11B illustrate restricted responsiveness to touch for displayed objects. In FIG. 11A, a system 1100 includes a display device 1110 having a canvas 1120 for displaying virtual objects. The canvas 1120 includes display of a first virtual object 1140, as well as other virtual objects 1142. Hovering over the first virtual object 1140 is a stylus 1130. Based upon detecting that the stylus 1130 is hovering (as demonstrated by region 1132) over the first virtual object 1140, the system 1100 increases inertia of the first virtual object 1140, as compared to the other virtual objects 1142. The increased inertia of the first virtual object 1140 may correspond to increased difficulty with which the virtual object 1140 may be moved from its original displayed position. For example, the increased inertia of the first virtual object 1140 can potentially require the use of additional touch contact of more fingers, such as three or four, to initiate motion instead of one or two fingers. In this regard, although the first virtual object 1140 moves in response to touch input, the movement (e.g., translation, rotation, etc.) is damped relative to the movement the same touch input causes on the other virtual objects 1142, which are otherwise the same as the first virtual object 1140.

In FIG. 11B, the stylus 1130 provides input that contacts the first virtual object 1140, such as writing on the first virtual object 1140 using the stylus 1130. Because the stylus 1140 is contacting the first virtual object 1140, the system 1100 is configured to substantially lock the first virtual object 1140 from responding to a second input (e.g., a touch input) provided to the first virtual object 1140. Accordingly, as long as the stylus 1130 is contacting the first virtual object 1140, subsequent touch inputs to the first virtual object 1140 will not cause a corresponding movement of the first virtual object 1140 since the first virtual object 1140 is locked. The other virtual objects 1142 remain unlocked and freely move in response to touch input. In addition, because the stylus 1130 is now writing on the first virtual object 1140, the system 1110 locks the first virtual object 1140, as opposed to the increased inertia applied for a hovering stylus. The system 1110 applies the more severe restriction of locking because the impact of allowing an inadvertent touch contact to cause movement of the first virtual object 1140 is greater when the first virtual object 1140 is being written on than when the stylus 1130 is hovering over the first virtual object 1140.

Figure 12:
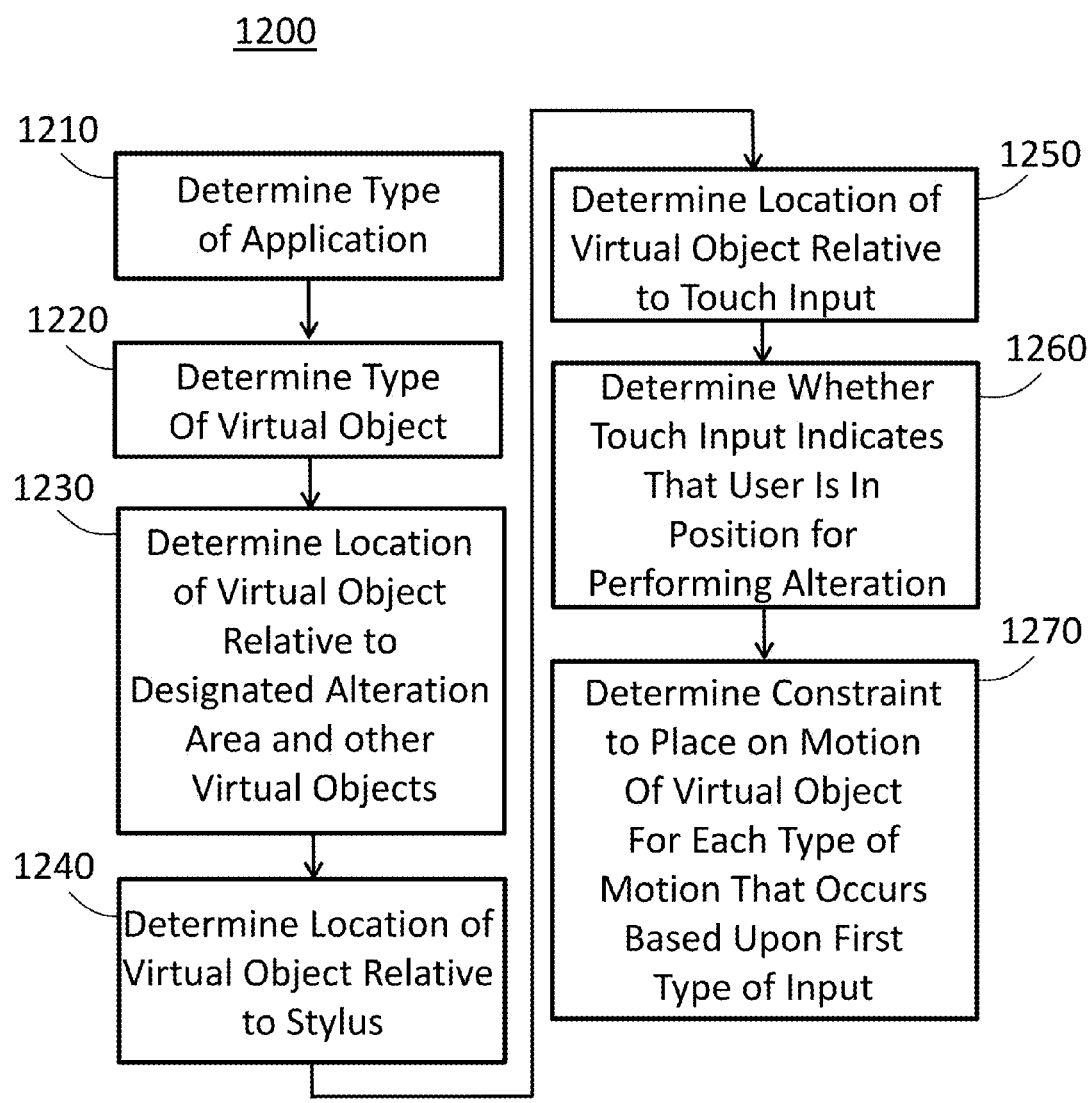
FIG. 12 is a flowchart of an example process for constraining motion of displayed objects.

FIG. 12 illustrates an example process 1200 for constraining motion of displayed objects. The process 1200 may be used to restrict, for a subset of virtual objects, responsiveness of the first type of input referenced above with respect to reference numeral 1010.

The system 200 determines a type of application which is generating display of virtual objects on the display device (1210). In some implementations, applications may generate specific types of virtual objects that are more conducive for alteration than other types of virtual objects. For example, graphical applications generate virtual objects that are frequently altered. By contrast, archival applications, such as genealogical record storage applications, generate virtual objects that may be read-only objects, wherein alterations are not allowed. Accordingly, the type of application may be useful in determining how to restrict movement of virtual objects under certain circumstances.

The system 200 determines a type of virtual object displayed on the display device (1220). In some implementations, the virtual object is an alterable or a non-alterable virtual object. For example, if the virtual object is alterable, then the type of virtual object is of a first type of virtual object. Conversely, if the virtual object is unalterable, then the type of virtual object is of a second type of virtual object. Similarly, if the virtual object is alterable, but infrequently altered, then the type of virtual object is of a third type of virtual object. The type of virtual object may be useful in determining how to restrict movement of virtual objects under certain circumstances.

The system 200 determines a location of the virtual object relative to a designated alteration area and to other virtual objects (1230). In some implementations, an area is designated in which virtual objects are altered. For example, a display device has a designated region in which virtual objects are brought into for the purpose of inputting, modifying, outputting, or removing information. In some instances, virtual objects within the designated alteration area are restricted more severely than virtual objects outside of the designated alteration area.

In addition, a location of the virtual object relative to other virtual objects may be useful in determining how to restrict movement of the virtual object. For instance, if the virtual object is positioned adjacent to another object that is being written on and contact between the virtual object and the other object causes movement of the other object, the system 200 may determine to restrict movement of the virtual object in the direction toward the other object, but not in other directions.

The system 200 determines a location of the virtual object relative to a stylus (1240). In some implementations, location of the virtual object relative to a stylus includes a location of a contacting stylus or a location of a hovering stylus. For example, the contacting stylus provides contacting input to a detector associated with the display device or the hovering stylus provides indirect input to the detector associated with the display device. The location of the virtual object relative to the stylus may be useful in determining how to restrict movement of the virtual object in terms of severity and types of motion constraints applied.

The system 200 determines location of the virtual object relative to a touch input (1250). The touch input may be a point touch provided by a user's finger or may be an incidental touch provided by a resting body part of the user (e.g., a palm or forearm). In some examples, the location of the virtual object relative to a stylus is determined prior to determining the location of the virtual object relative to a touch input. For instance, the stylus is used first by a user to provide modifications to the virtual object, and then the touch input is provided by the user, either intentionally or unintentionally. In other examples, the system 200 determines the location of the virtual object relative to the touch input without regard for the location of the virtual object relative to a stylus. The location of the virtual object relative to the touch input may be useful in determining how to restrict movement of the virtual object in terms of severity and types of motion constraints applied.

The system 200 determines whether the touch input indicates that the user is in a position for performing alteration (1260). In some implementations, the touch input results in providing an inadvertent touch input by the user while the user is attempting to alter the virtual object located within the alteration area. For example, the user accidentally makes contact with the detector 212 while altering the virtual object using, for example, the stylus. When a user is in an alteration position, the system 200 may determine to apply a more severe movement restriction, especially for virtual objects located near the alteration position.

The system 200 determines one or more constraints to place on motion of the virtual object for each type of motion that occurs based on the first type of input (1270). In some implementations, the one or more constraints on motion include motion related to translation of the virtual object, rotation of the virtual object, scaling (either up or down) of the virtual object, or combinations of translation, rotation, and/or scaling. For example, constraints on translational motion of the virtual object limit how the virtual object responds to inputs that would result in translation of the virtual object. In this example, the system 200 may damp translational motion of the virtual object, completely suppress translational motion of the virtual object, and apply different constraints for different directions of translational motion (e.g., allow unrestricted translational motion in a first direction, damp translational motion in a second direction, and completely suppress translational motion in a third direction).

In some implementations, constraints on rotational motion of the virtual object limit how the virtual object responds to inputs that would result in rotation of the virtual object. In these implementations, the system 200 may damp rotational motion of the virtual object, completely suppress rotational motion of the virtual object, and apply different constraints for different directions of rotational motion (e.g., damp rotational motion in a first direction and completely suppress rotational motion in a second direction).

In some examples, constraints on scaling motion of the virtual object limit how the virtual object responds to inputs that would result in scaling of the virtual object. In these implementations, the system 200 may damp scaling motion of the virtual object, completely suppress scaling motion of the virtual object, and apply different constraints for different directions of scaling motion (e.g., damp scaling motion in a first direction and completely suppress scaling motion in a second direction).

Figure 13:
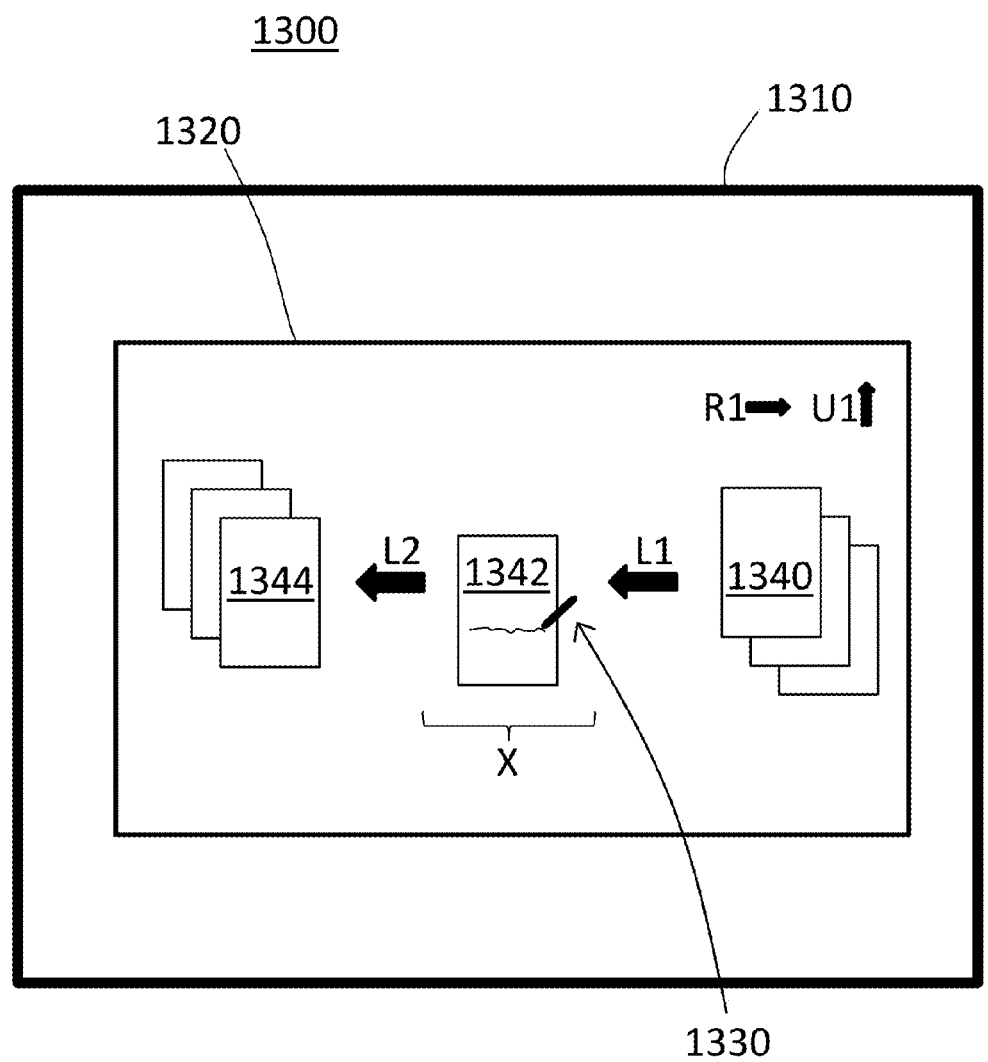
FIG. 13 is a diagram illustrating example motion constraints for displayed objects.

FIG. 13 illustrates example motion constraints for displayed virtual objects. For example, FIG. 13 illustrates a system 1300 by which an authorized user may review, sign, and/or edit formal documents, such as contracts, agreements, and paychecks. In FIG. 13, the system 1300 includes a display device 1310 having a canvas 1320 for displaying virtual objects. The canvas 1320 includes display of a first grouping of virtual objects 1340, a second grouping of virtual objects 1344, and a region X between the first and second groupings of virtual objects 1340 and 1344. In some implementations, the first grouping of virtual objects 1340 includes particular types of virtual objects. For example, the first grouping of virtual objects 1340 may include documents that can be reviewed and modified, such as being signed by a user.

In this example, the system 1300 has detected a pattern of a user moving a virtual object from the first grouping 1340 to the region X, altering (e.g., signing) the virtual object at the region X, and then moving the virtual object from the region X to the second grouping 1344. Based on the detected pattern, the system 1300 constrains motion of virtual objects of the first grouping of virtual objects 1340 to allow movement only along a leftward direction L1. In addition, the motion of virtual objects of the first grouping of virtual objects 1340 are constrained to be substantially dampened for translational movement along a rightward direction R1 and/or an upward direction U1, and may be slightly dampened for scaling S1 up or down (in a situation where the user may want to review the virtual object in an enlarged format view).

In some implementations, a user selects a topmost one of the virtual objects of the first grouping of virtual objects 1340 by providing input corresponding to a location of a topmost one of the virtual objects of the first grouping of virtual objects 1340 along the leftward direction L1. The topmost one of the virtual objects of the first grouping of virtual objects 1340 is translated along the leftward direction L1 to the region X between the first and second groupings of virtual objects 1340 and 1344, and identified as virtual object 1342.

In some examples, all (or some) motion of the first and second groupings of virtual objects 1340 and 1344 are damped until a threshold condition is met. For example, motion of the first grouping of virtual objects 1340 is substantially damped for directions other than the leftward direction L1. However, once the topmost one of the virtual objects of the first grouping of virtual objects 1340 is translated along the leftward direction L1 into the region X between the first and second groupings of virtual objects 1340 and 1344, thereby meeting a threshold, the virtual object 1342 is not be substantially restricted for modification and/or is not be damped. For example, the virtual object 1342 is signed or edited using a stylus 1330. However, there are constraints to allow movement only along a leftward direction L1 for the virtual object 1342. In addition, the motion of the virtual object 1342 is constrained to be substantially dampened for translational movement along a rightward direction R1 and/or an upward direction U1, is slightly dampened for scaling S1 up or down (in situation where the user wants to review the virtual object in an enlarged format view), and is slightly damped for rotation along first and/or second rotational directions (in situations where the user is more comfortable signing their name at a substantial angle).

In some implementations, the virtual object 1342 is translated along the leftward direction L2. Upon being translated out of the region X, the virtual object 1342 is significantly restricted for modification. For example, the virtual object 1342 is locked for further editing. In addition, there are constraints to restrict movement along a further leftward direction past the leftward direction L2 for the virtual object 1342 once the virtual object 1342 is translated out of the region X. Moreover, the motion of the virtual object 1342 is constrained to be substantially dampened for translational, rotational, and/or scaling movement once the virtual object 1342 is translated out of the region X and onto the second grouping 1344.

Figure 14:
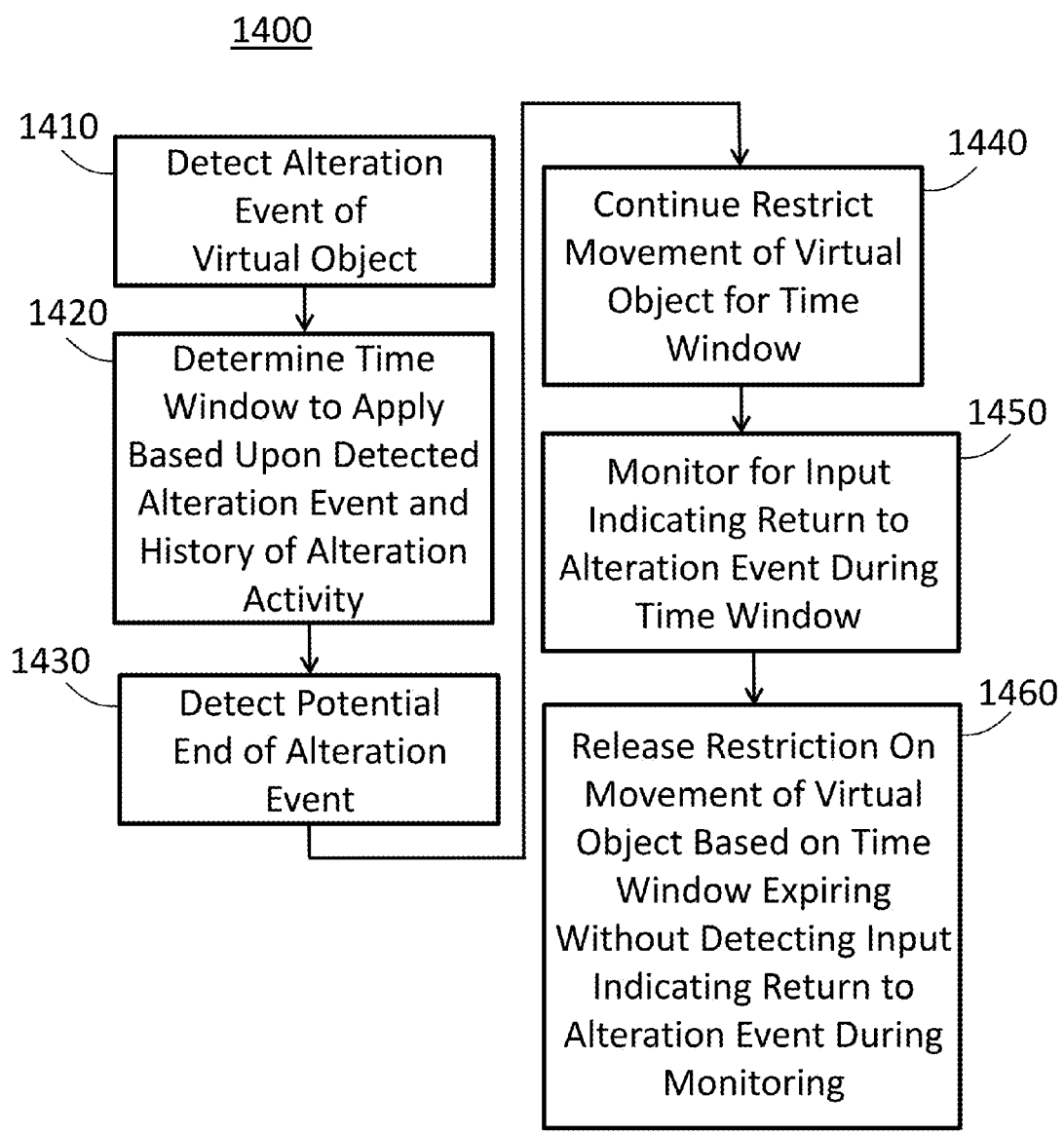
FIG. 14 is a flowchart of an example process for restricting movement of displayed objects using time windows.

FIG. 14 illustrates an example process 1400 for restricting movement of displayed objects using time windows. In FIG. 14, the system 200 detects an alteration event of a virtual object (1410). The system 200 may detect the alteration event by detecting a stylus input being provided to the virtual object. In some implementations, an alteration event includes adding, altering, or removing features of a virtual object. For example, detecting the alteration event includes time-based comparisons of the virtual object in order to detect differences of the virtual object. Accordingly, a history of alteration activity of the virtual object is developed. The history of alteration activity of the virtual object may indicate how the object has been altered in the past (e.g., relatively near past) and, perhaps, how similar virtual objects have been altered in the past over time. The history of alteration activity may be useful in determining how long of a time window to apply.

The system 200 determines a time window (1420). In some implementations, a time window is determined based upon detecting an alteration event of a virtual object, as well as the history of alteration activity. The time window may be an amount of time that the system 200 waits prior to releasing the virtual object from a restricted state that was entered due to the alteration event. The system 200 may analyze the history of alteration activity to determine the time window. For instance, to the extent relatively long gaps exists between stylus detections for the alteration event, the system may set a relatively long time window. To the extent relatively long gaps do not exist between stylus detections for the alteration event, the system may set a relatively short time window.

The system detects a potential end of the alteration event (1430). For instance, the system 200 may detects a potential end of the alteration event based on ceasing to detect a stylus (either contacting or hovering) that was performing the alteration event. In some implementations, the potential end of the alteration event is detected based upon the history of alteration activity. For example, if a user's interaction with a virtual object (or similar type of virtual object) is predictable, such as reviewing and signing documents, then the potential end of the alteration event is detected based on the predictable interaction.

The system 200 continues to restrict movement of the virtual object for the time window after detecting the potential end of the alteration event (1440). For example, even though the system 200 ceases to detect a stylus that was performing the alteration event, the system 200 continues to restrict movement of the virtual object to allow time for the user to return to the alteration event. In this example, if the user does desire to return to the alteration event, the continued restriction reduces the likelihood of an inadvertent or incidental contact causing movement of the virtual object that would disrupt the alteration event.

In some implementations, the time window is relatively long based upon a time required to detect an end of the alteration event. For instance, alterations made by a user of the virtual object are significant and require a substantially amount of time to complete.

In some implementations, the time window is relatively short based upon a time required to detect an end of the alteration event. For instance, alterations made by a user of the virtual object are minor and require a short amount of time to complete.

The system 200 monitors for input indicating a return to the alteration event during the time window (1450). In some implementations, a user periodically ceases providing input to the virtual object, but continues providing input to the virtual object during a relatively short period of time from the pause in providing input. For example, a user takes a few moments to review features of the virtual object and then continues to edit, remove, or add to the features of the virtual object. The system 200 monitors for inputs, such as stylus inputs, that suggest that the user has returned to the alteration event.

The system releases the restriction on movement of the virtual object based on the time window expiring without the monitoring detecting input indicating a return to the alteration event (1460). For instance, to the extent that the time window expires without detecting another stylus input at the virtual object, the system 200 releases the restriction on movement of the virtual object and the virtual object is once again fully responsive to touch inputs.

In some implementations, the time window is relatively short, wherein the release on the restriction on movement of the virtual object occurs shortly after no further input indicating return to the alteration event is received. For example, when a user is simply reviewing and signing standard documents, such as employee paychecks, the time window expires rather quickly, as compared to when a user is reviewing and editing a contract agreement.

Figure 15A:
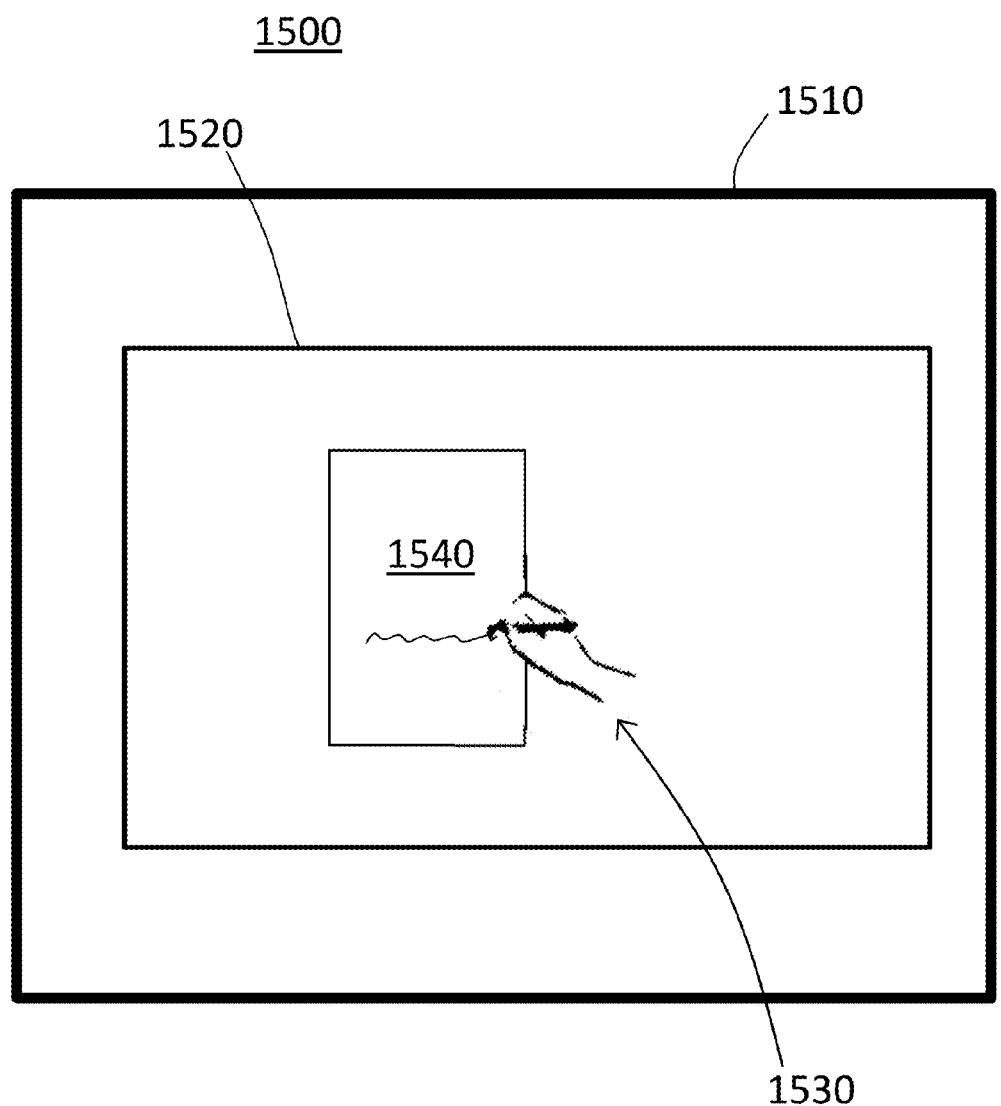
FIGS. 15A and 15B are diagrams illustrating an example of handling displayed objects based on time windows.
Figure 15B:
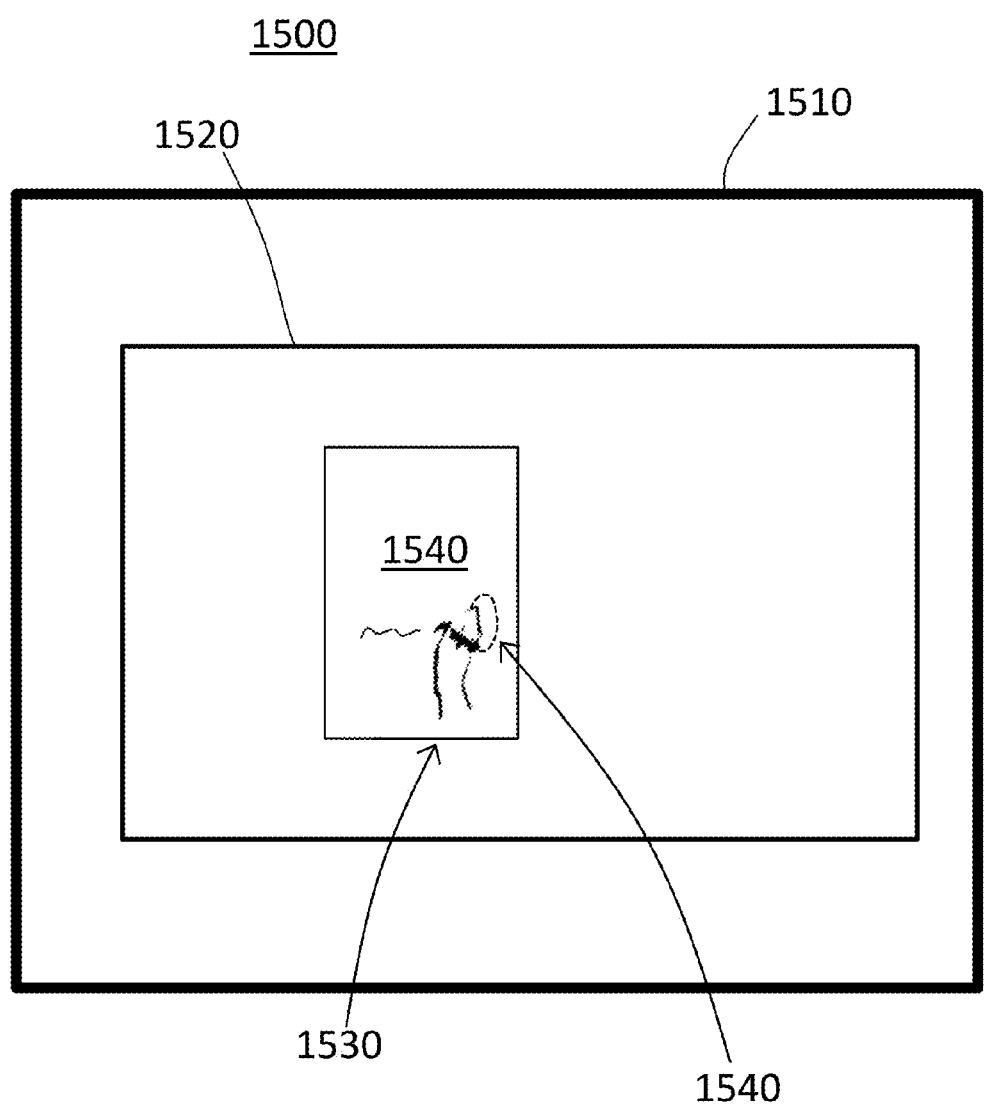

FIGS. 15A and 15B illustrate an example of handling virtual objects based on time windows. In FIG. 15A, a system 1500 includes a display device 1510 having a canvas 1520. A virtual object 1540 is provided within the canvas 1520, and a user 1530 is providing input to the virtual object 1540. In some implementations, the input provided by the user 1530 includes use of a stylus to edit the virtual object 1540. In these implementations, the virtual object 1540 is restricted from movement because of the writing input being provided by the user 1530 using the stylus. For example, the restricted movement of the virtual object 1530 includes one or more motions, such as translation, rotation, and/or scaling of the virtual object 1530.

In some implementations, the user's input is relatively constant over time. For example, the input provided by the user 1530 includes editing the virtual object 1540, such as adding a narrative writing to the virtual object 1540. Accordingly, the input provided by the user 1530 does not necessarily include significant pauses (or lapses in time) during writing. However, there are periods of time when the user 1530 pauses when adding the narrative writing to the virtual object 1540.

In FIG. 15B, the user 1530 pauses providing the input to the virtual object 1540. In some implementations, the user 1530 rests his hand and raises the stylus away from the virtual object 1540. For example, the user 1530 rests his hand on the virtual object 1540, thereby discontinuing input using the stylus to the virtual object 1540 and providing an additional input 1550 overlying the virtual object 1540. Accordingly, the stylus is placed in a position that is parallel or substantially parallel with an input surface of the display device 1510 and, at that position, the system 1500 does not detect the stylus.

In some implementations, movement of the virtual object 1540 is restricted within a threshold period of time from when the stylus was last detected. For example, since the system 1500 no longer detects input provided by the stylus, but now instead receives the additional input 1550 provided by the user's hand, the additional input 1550 may cause movement of the virtual object 1540. However, because the virtual object 1540 remains restricted for the time window (e.g., a time period in which input from the stylus is not detected), the additional input 1550 does not cause movement of the virtual object 1540 and the user may resume writing without an interruption caused by movement of the virtual object 1540, as long as the user resumes writing within the time window in a manner that enables the system 1500 to detect the stylus prior to expiration of the time window.

Figure 16:
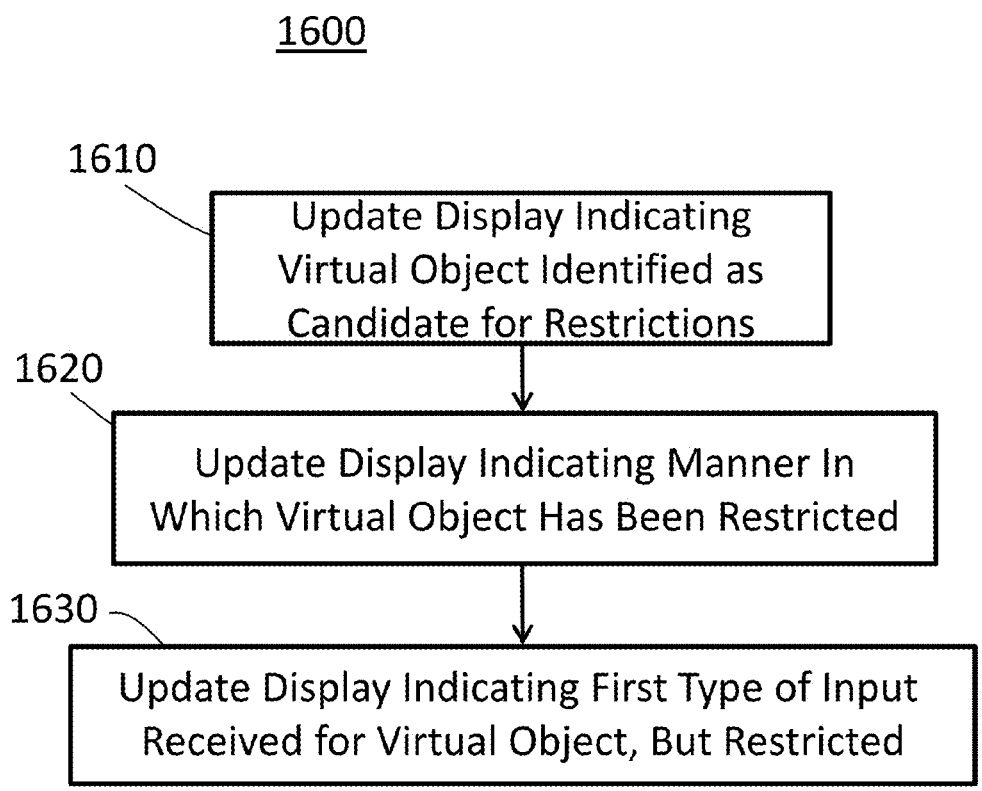
FIG. 16 is a flowchart of an example process for updating display of objects.

FIG. 16 illustrates an example process 1600 for updating display of virtual objects. In FIG. 16, the system 200 updates the display of the virtual objects indicating that one or more of the virtual objects have been identified as being candidates for restriction (1610). In some implementations, the system 200 updates the display of the virtual objects by indicating that one or more of a subset of the virtual objects have been identified as being candidates for restriction. For example, updating the display of the virtual objects includes modifying the display of the virtual objects that have been identified as being candidates for restriction. In this example, the system 200 may highlight or otherwise designate the virtual objects that have been identified as being candidates for restriction.

The system 200 updates the display of the virtual objects to indicate a manner in which the one or more of the virtual objects have been restricted (1620). In some implementations, the display of the virtual objects includes highlighting (or differentiating) the one or more of the virtual objects that have been identified as being candidates for restriction from the virtual objects that have not been identified as being candidates for restriction. In addition, one or more of the virtual objects that have been identified as being candidates for restriction are displayed on the display device having an indication, such as a ghosted or anchored representation, to indicate that the one or more of the virtual objects are completely restricted from translation, rotational, and scaling movement. Further, one or more of the virtual objects that have been identified as being candidates for restriction are displayed on the display device having unique indications related to each of translation, rotational, and/or scaling restrictions.

The system 200 updates the display of the virtual objects to indicate the first type of input has been received for the first virtual object included in the subset of virtual objects, but movement of the first virtual object is restricted (1630). In some implementations, the display of the first virtual object includes highlighting (or differentiating) the first virtual object based upon receiving the first type of input from other virtual objects displayed on the display device. For example, when the first type of input is provided to the first virtual object, the first object is displayed on the display device having a ghosted representation, whereas other virtual objects remain being displayed in their original representation, i.e., not in a ghosted representation. In addition, when the first type of input is provided to the first virtual object, the first object may be shown as being stretched a point of contact, but not completely moved until the pulling reaches a threshold amount.

Figure 17A:
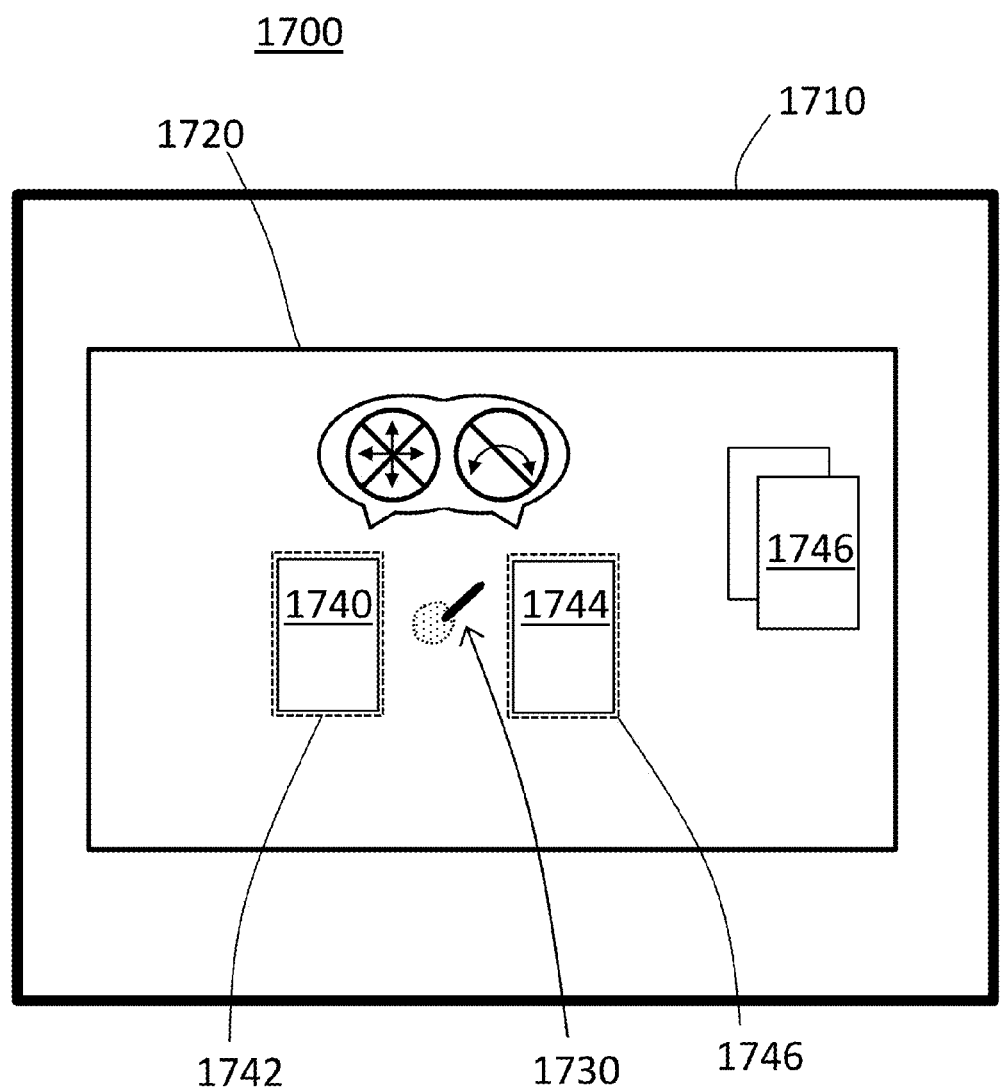
FIGS. 17A-17D are diagrams illustrating an example of updating the display of objects.

FIGS. 17A-17D illustrate an example updating the display of virtual objects. In FIG. 17A, a system 1700 includes a display device 1710 having a canvas 1720. Virtual objects 1740, 1744, and 1746 are displayed within the canvas 1720. An input device, such as a stylus 1730, is provided at a location of the display device 1710 between the virtual objects 1740 and 1744. In some implementations, the input device is a hovering stylus 1730 positioned between the virtual objects 1740 and 1744. As a result, the virtual objects 1740 and 1744 are highlighted 1742 and 1746 to identify the virtual objects 1740 and 1744 as being candidates for restriction due to their proximity to the hovering stylus 1730. The other virtual objects 1746 are not located within a threshold distance from the hovering stylus 1730, and are not highlighted as the virtual objects 1740 and 1744 are highlighted 1742 and 1746. Accordingly, the other virtual objects 1746 are not identified, by highlighting, as candidates for restriction.

In some implementations, restrictions for the virtual objects 1740 and 1744 include damping of particular movements. For example, translational movements of the virtual objects 1740 and 1744 are damped at a high level (meaning no translational movement), whereas rotational movements of the virtual objects 1740 and 1744 are damped at a medium level (meaning some rotational movement is allowed). Accordingly, the virtual objects 1740 and 1744 are substantially limited with respect to translational movement and less limited in rotational movement, but have low (or no) limit to scaling up or down.

Figure 17B:
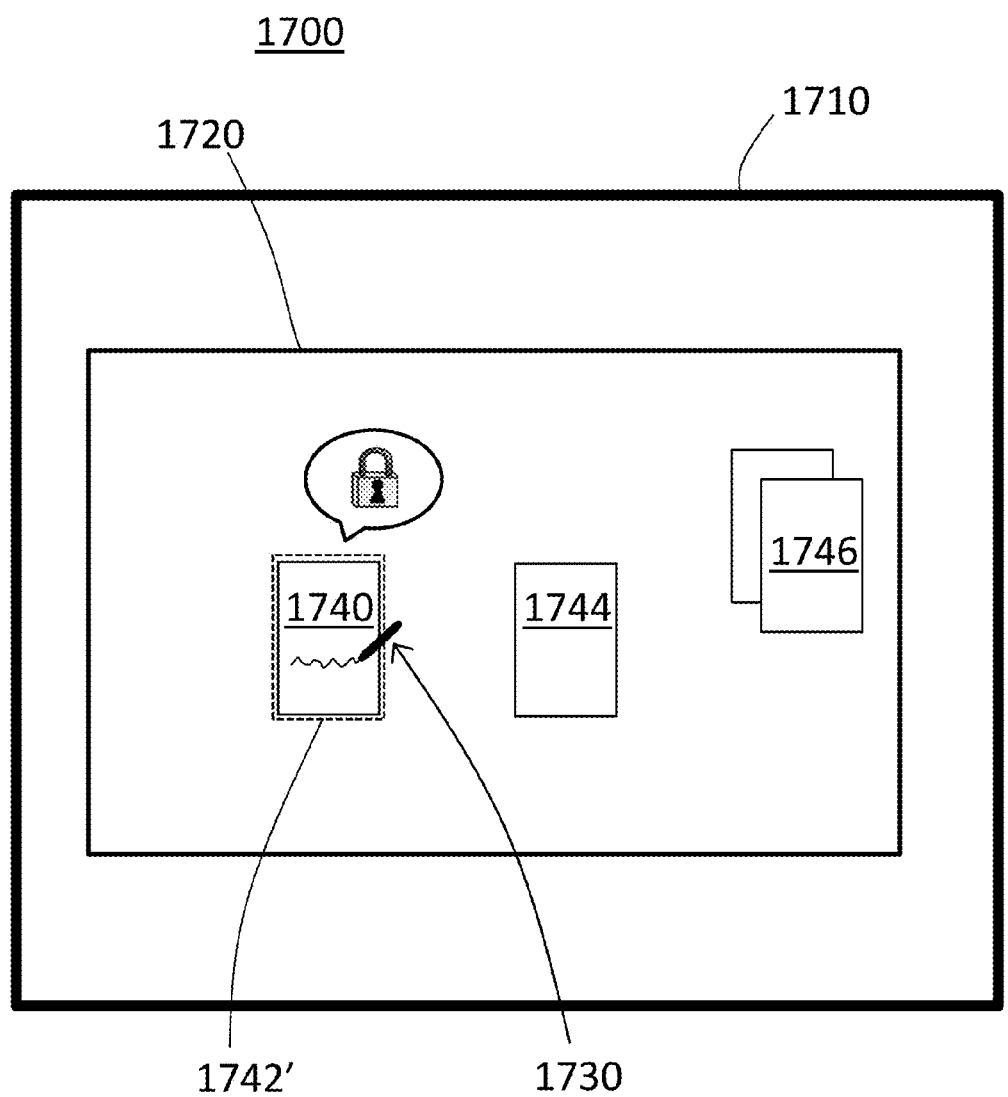

In FIG. 17B, the stylus 1730, which previously was hovering between the virtual objects 1740 and 1744, is now providing input (i.e., writing) on the virtual object 1740. Accordingly, the display of the virtual objects 1740, 1744, and 1746 is updated. In some implementations, highlighting 1746 of the virtual object 1744 is removed, but the virtual object 1740 remains highlighted 1742'. In some implementations, the highlighting 1742' of the virtual object 1740 is the same or different from the highlighting 1742, as shown in FIG. 17A. For example, the highlighting 1742' of the virtual object 1740 may change in size, thickness, configuration, or color, as compared to the highlighting 1742 of the virtual object 1740 shown in FIG. 17A. In addition, the highlighting 1742' of the virtual object 1740 indicates an increased damping of the virtual object 1740 due to the contact of the stylus 1730.

In some implementations, providing the input on the virtual object 1740 substantially damps (or locks) the virtual object 1740 from substantially all movement until a threshold level of input is supplied to the virtual object 1740. For example, while a user is writing on the virtual object 1740, no other input (either purposeful or inadvertent) would allow for movement of the virtual object 1740 due to the completely damped (or locked) state until the threshold level of input is supplied. Accordingly, as long as the user is writing on the virtual object 1740, the virtual object 1740 remains stationary on the canvas 1720.

Figure 17C:
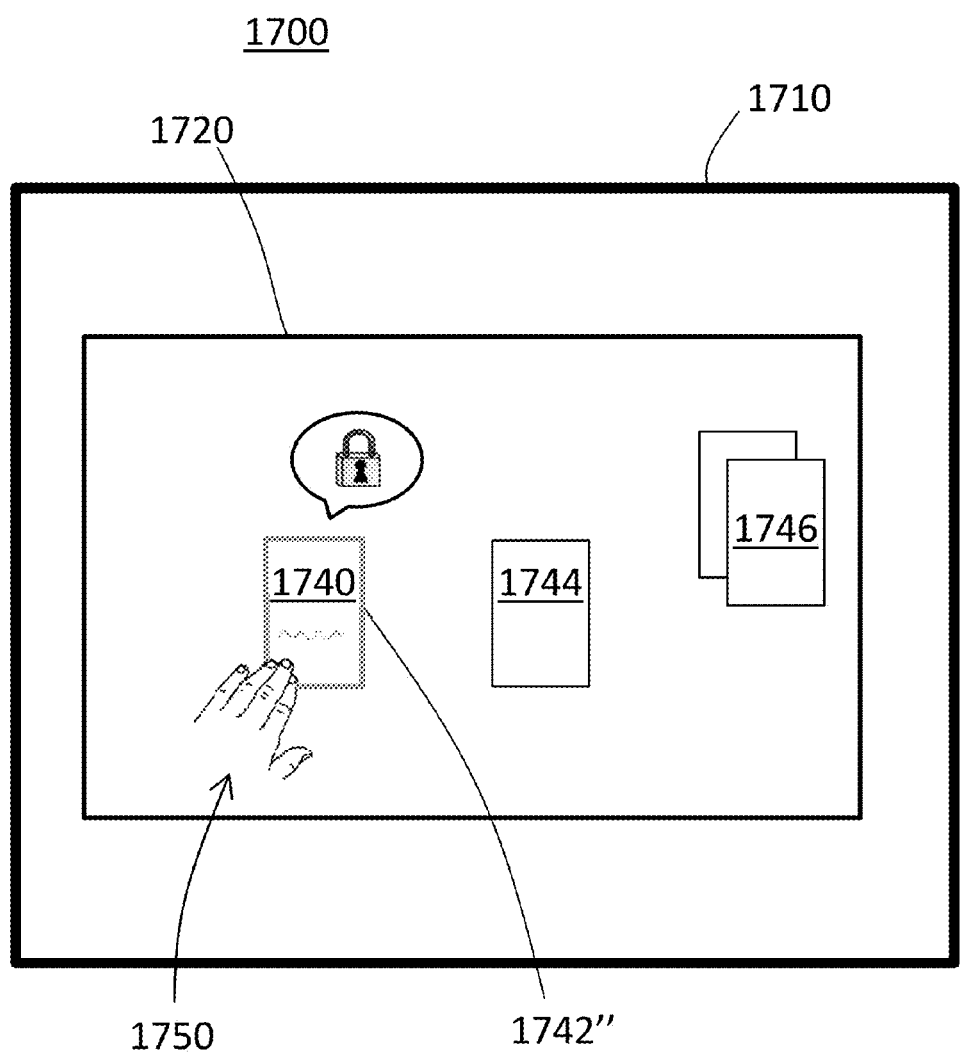

In FIG. 17C, a touch input 1750 is supplied to the virtual object 1740. However, since the virtual object 1740 is substantially damped (or locked), the touch input 1750 does not result in moving the virtual object 1740. In some implementations, an indication is provided indicating that the touch input 1750 has been received. For example, the indication includes changing the highlighting 1742' (in FIG. 17B) to highlighting 1742" of the virtual object 1740.

Figure 17D:
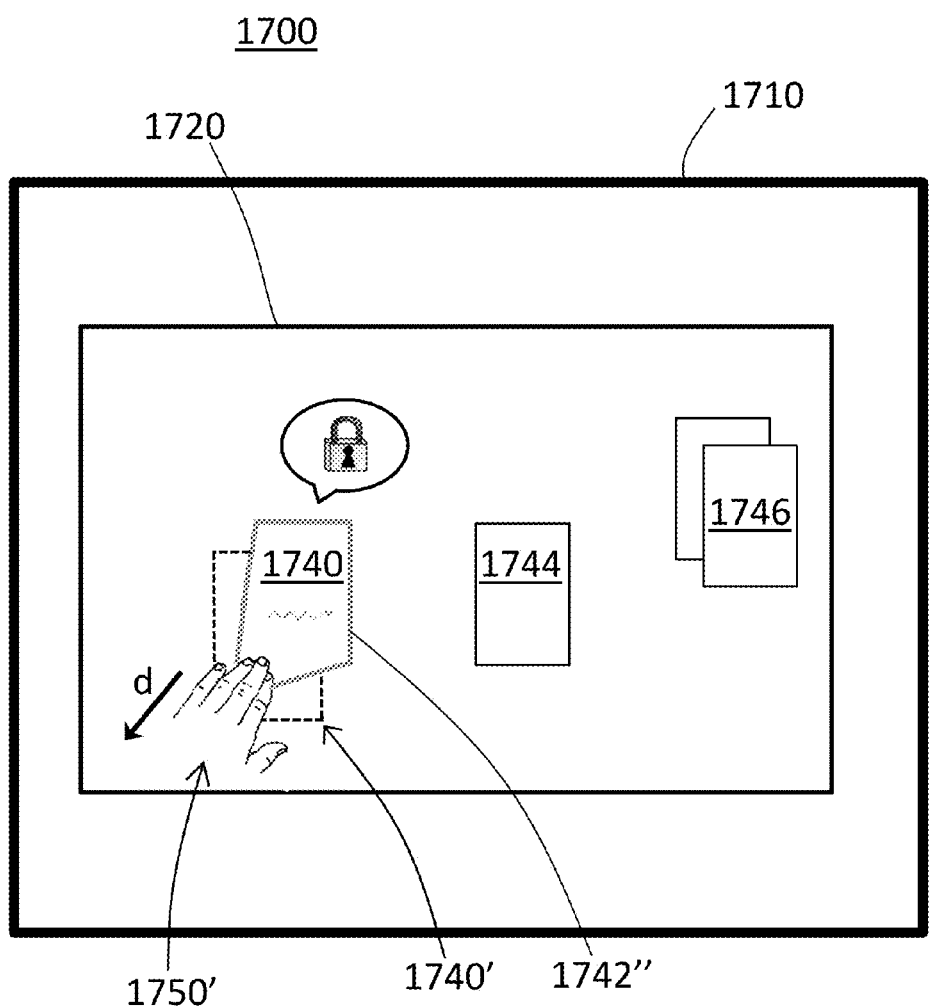

In FIG. 17D, the touch input 1750 is now shown to include a dragging component 1750' on the virtual object 1740 along a direction "d". Upon receiving the dragging component 1750' along the direction "d", the highlighting 1742" of the virtual object 1740 is altered corresponding to an amount of the dragging component 1750'. In some implementations, the dragging component 1750' continues until a threshold distance is supplied, whereby the damping of the virtual object 1740 changes from the completely damped (locked) condition to a damping that would allow for movement. For example, when the threshold distance is substantially equal to the threshold level of input supplied to the virtual object 1740, then the damping of the virtual object 1740 changes such that the display of the virtual object 1740 on the display device 1710 shows movement of the virtual object 1740 having a snapping motion. Accordingly, the moved virtual object 1740 is displayed as a virtual object 1740'.

In some implementations, touch inputs can include other dragging motions in order to sufficiently change the damping condition of the virtual object 1740. For example, dragging motions can include rotational and/or scaling motion inputs. When the dragging motions include rotational motion inputs, the highlighting 1742' (in FIG. 17B) of the virtual object 1740 may change to have a corresponding rotational change. When the dragging motions include scaling motion inputs, such as using two fingers in a pinching motion (zoom out) or spreading motion (zoom in), the highlighting 1742' (in FIG. 17B) of the virtual object 1740 may change to have a corresponding scaling change.

Figure 18:
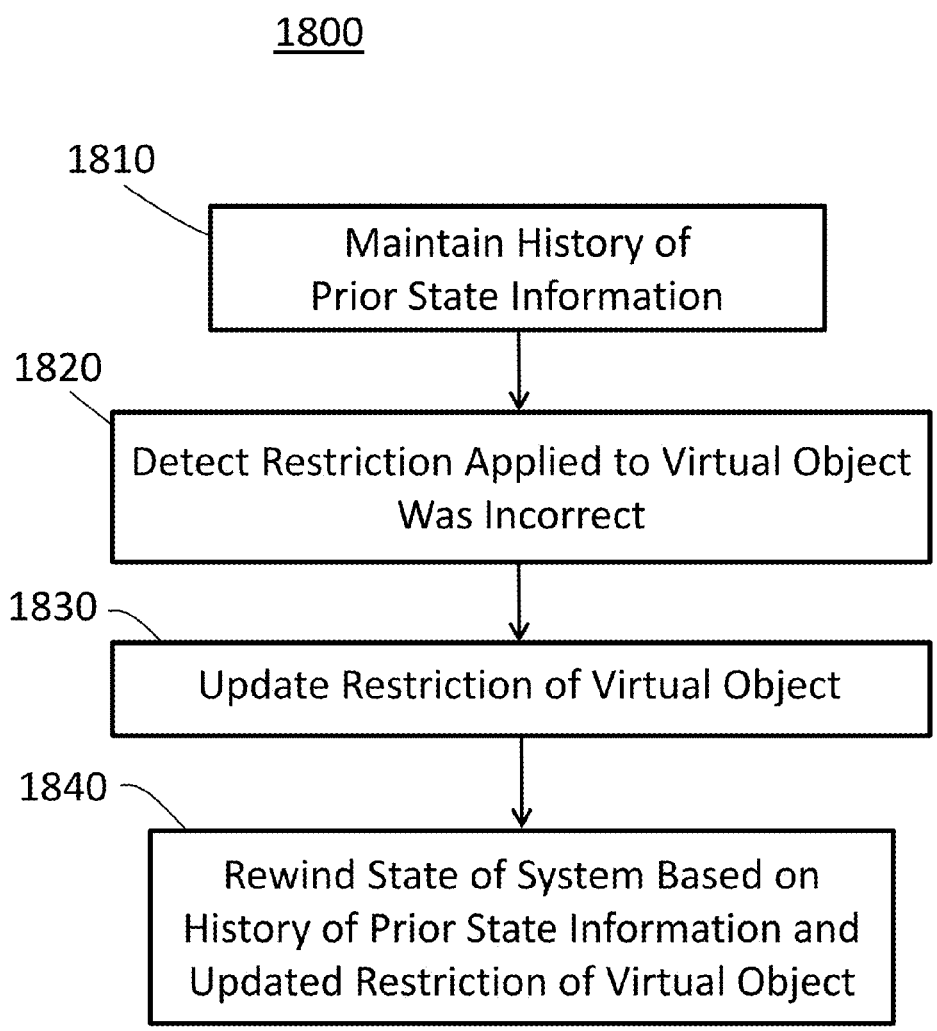
FIG. 18 is a flowchart of an example process rewinding a state of displayed objects.

FIG. 18 illustrates an example process for rewinding a state of displayed objects. In FIG. 18, the system 200 maintains a history of prior state information of a virtual object (1810). In some implementations, various states of the virtual object are stored in a memory. For example, positions of individual virtual objects displayed on a display device include location information and translational, rotational, and scaling position information over certain periods of time. Accordingly, this location and position information provides state information of virtual objects.

The state information may include, for each frame, location, position, and restrictions placed on virtual objects displayed on the display device. The system 200 may store the state information for either a particular number of seconds or frames. For example, the system 200 may save the previous thirty seconds worth of inputs and display manipulations. Once the system 200 fills the particular number of state information entries, then the system 100 may replace the oldest state information frame with the most recent state information frame.

The system 200 detects that a restriction applied to a virtual object to be incorrect (1820). In some implementations, the incorrectly applied restriction conflicts with a current restriction of the virtual object. For example, if the virtual object was identified as being a candidate for restriction, the system 200 may later determine that the virtual object should not have been identified as being a candidate for restriction based on additional input received. The additional input may indicate that the virtual object should not have been restricted or at least result in the system 200 being more confident than not that the virtual object should not have been restricted.

In another example, if the virtual object was not identified as being a candidate for restriction, the system 200 may later determine that the virtual object should have been identified as being a candidate for restriction based on additional input received. The additional input may indicate that the virtual object should have been restricted or at least result in the system 200 being more confident than not that the virtual object should have been restricted.

The system 200 updates the restriction of the virtual object to correct the previously incorrect restriction classification (1830). In some implementations, a memory portion of a display system displaying the virtual object is updated to reflect the appropriate restriction classification of the virtual object.

The system 200 rewinds the state of the display system based upon the history of the prior state information and the updated restriction of the virtual object (1840). In some implementations, the display of the virtual object reverts back to a condition prior to detecting the incorrect restriction on the virtual object. For example, the display device will re-display the virtual object in a manner that is consistent with the restriction classification now deemed appropriate. When the virtual object was incorrectly left unrestricted, the system 200 may reverse any actions performed on the virtual object based on input received when the virtual object should have been restricted. When the virtual object was incorrectly restricted, the system 200 may perform any actions that would have occurred based on input that was received when the virtual object was incorrectly restricted and, thus, suppressed.

Figure 19A:
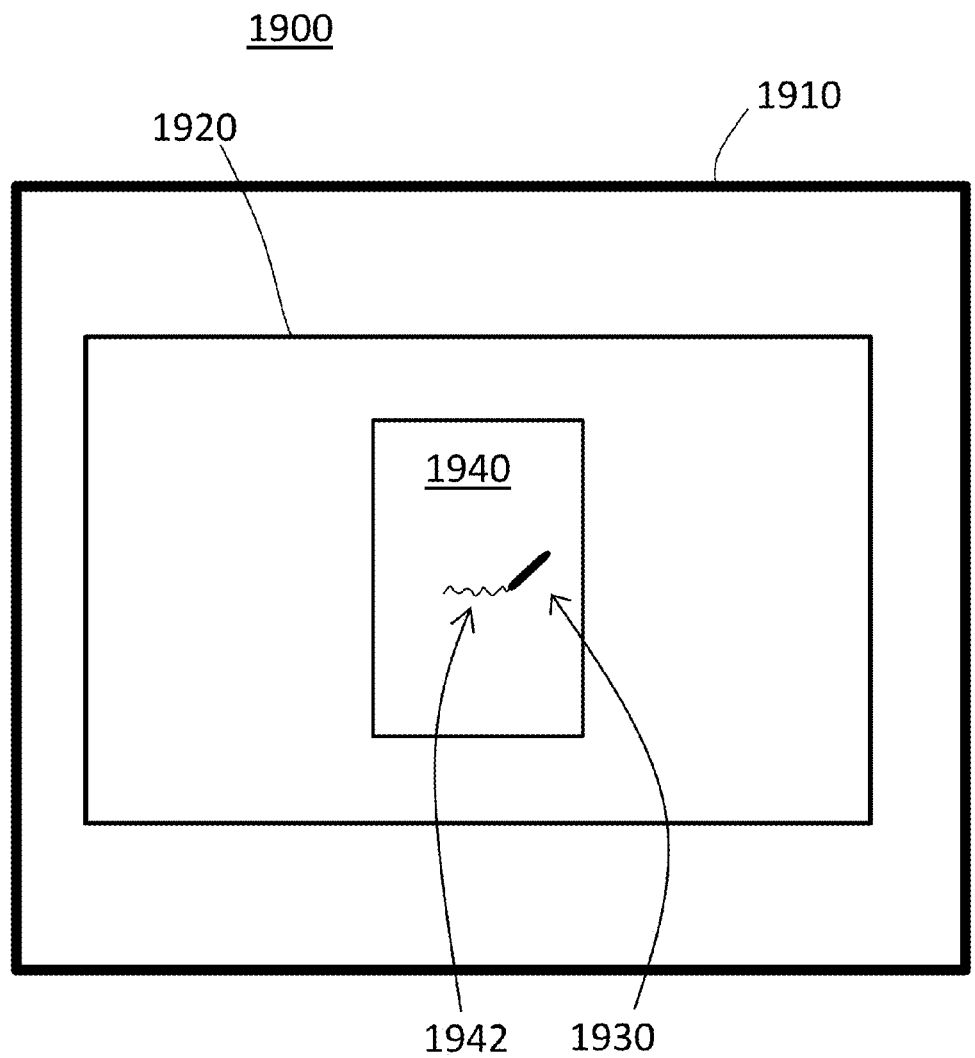
FIGS. 19A-19C are diagrams illustrating an example of rewind correction.
Figure 19B:
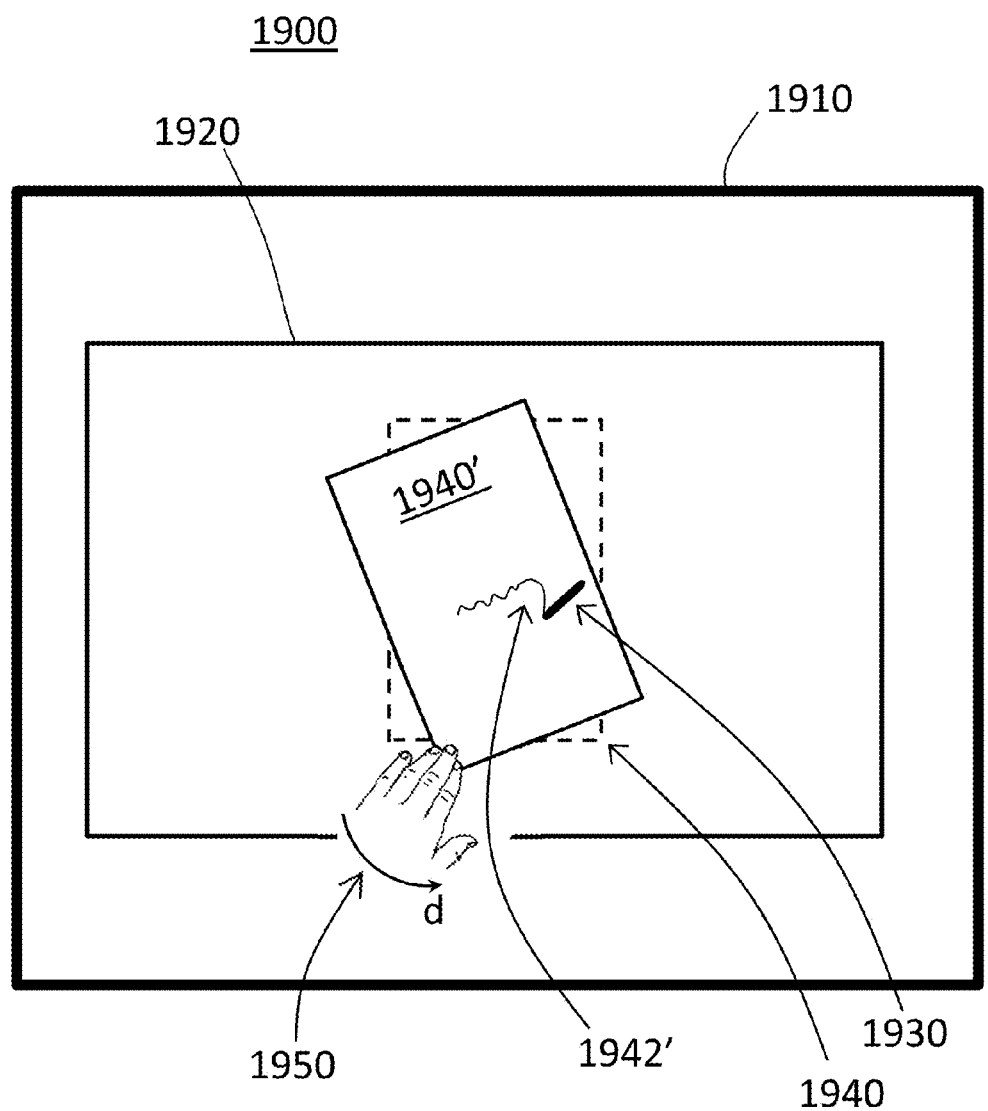
Figure 19C:
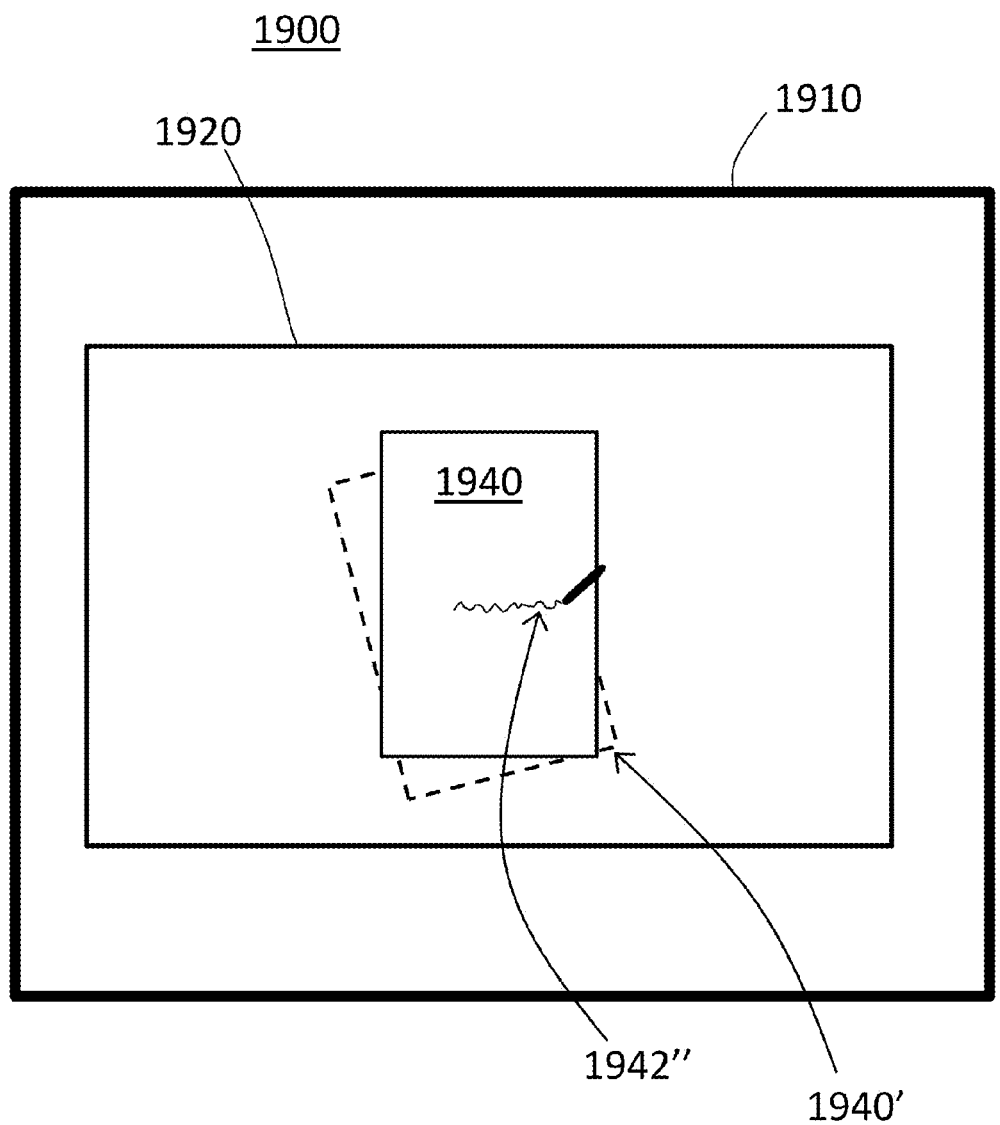

FIGS. 19A-19C illustrate an example of rewind correction. In FIG. 19A, a system 1900 includes a display 1910 having a canvas 1920. A stylus 1930 is shown providing input 1942 to a virtual object 1940 displayed on the canvas 1920. In some implementations, the virtual object 1940 is restricted for translational, rotational, and scaling motions. For example, translational, rotational, and/or scaling motions should be highly damped for the virtual object 1940. However, due to a system error, the virtual object 1940 has been left unrestricted while the stylus 1930 is providing input 1942 to the virtual object 1940.

In FIG. 19B, a touch input 1950 is inadvertently provided to the virtual object 1940. For example, the touch input 1950 causes a rotational motion along a direction "d" that results in rotating the virtual object 1940 to display the virtual object at a new position 1940'. However, since the stylus 1930 was still providing the input 1942 to the virtual object 1940 when the rotational motion was provided by the touch input 1950, the input 1942 to the virtual object now includes an inadvertent input (stray marking) 1942' by the stylus 1930. Because the virtual object 1940 was incorrectly left unrestricted, the touch input 1950 caused rotation of the virtual object 1940, instead of being ignored or damped.

In FIG. 19C, since the rotational motion provided by the touch input 1950 was determined to be inadvertent, the system 1900 determines that the virtual object 1940 was incorrectly left unrestricted. Based on the determination that the virtual object 1940 was incorrectly left unrestricted, the system 200 rewinds the state of the system 1900 to a state that would have resulted had the virtual object 1940 been properly restricted. For instance, display of the virtual object 1940 reverts back to its original position (in FIG. 19A). In some implementations, the inadvertent input 1942' (in FIG. 19B) is excluded in the reverted display of the virtual object 1940. In other implementations, the inadvertent input 1942' is included in the reverted display of the virtual object 1940 as a correct input 1942" and shown in correct orientation on the virtual object, but without the rotational orientation as shown in FIG. 19B.

Figure 20A:
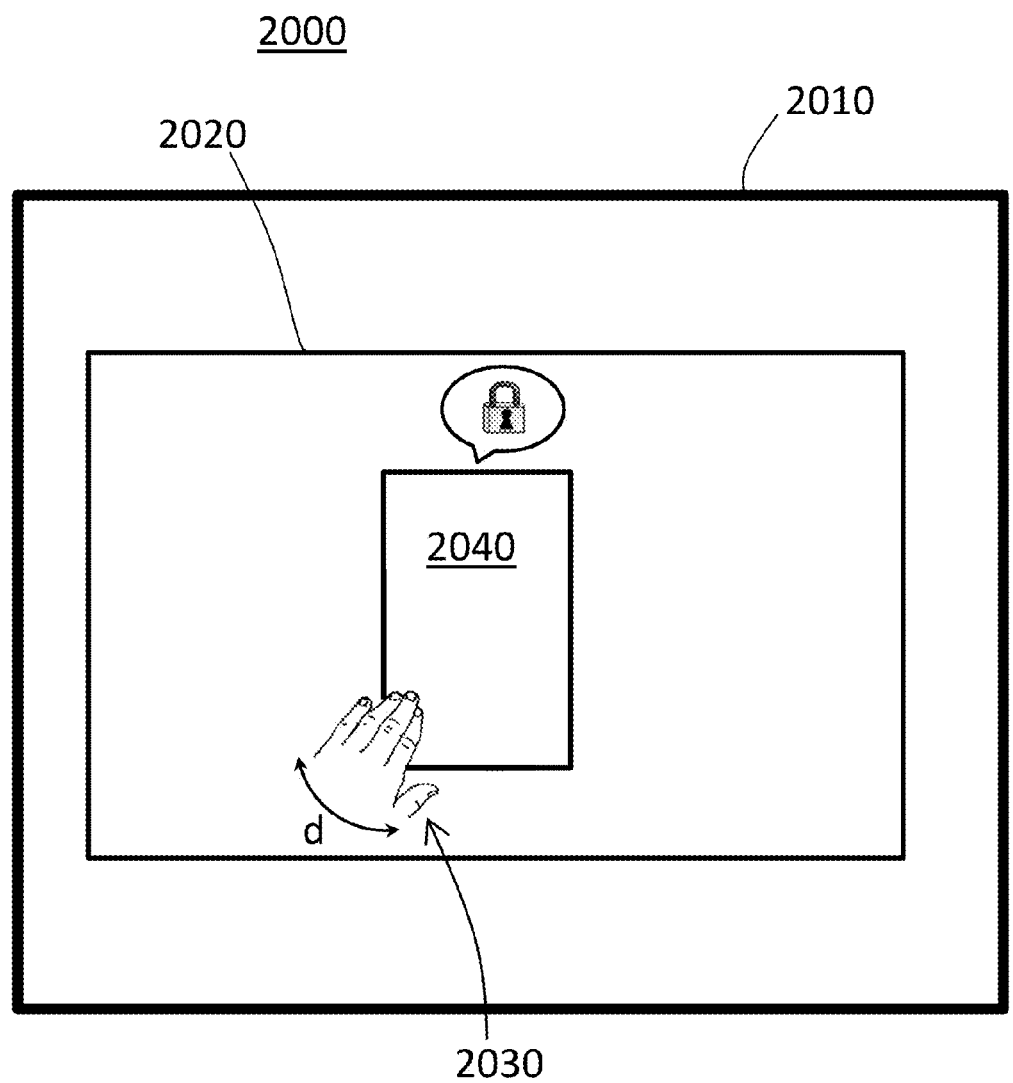
FIGS. 20A and 20B are diagram illustrating an example of locked and unlocked displayed objects.
Figure 20B:
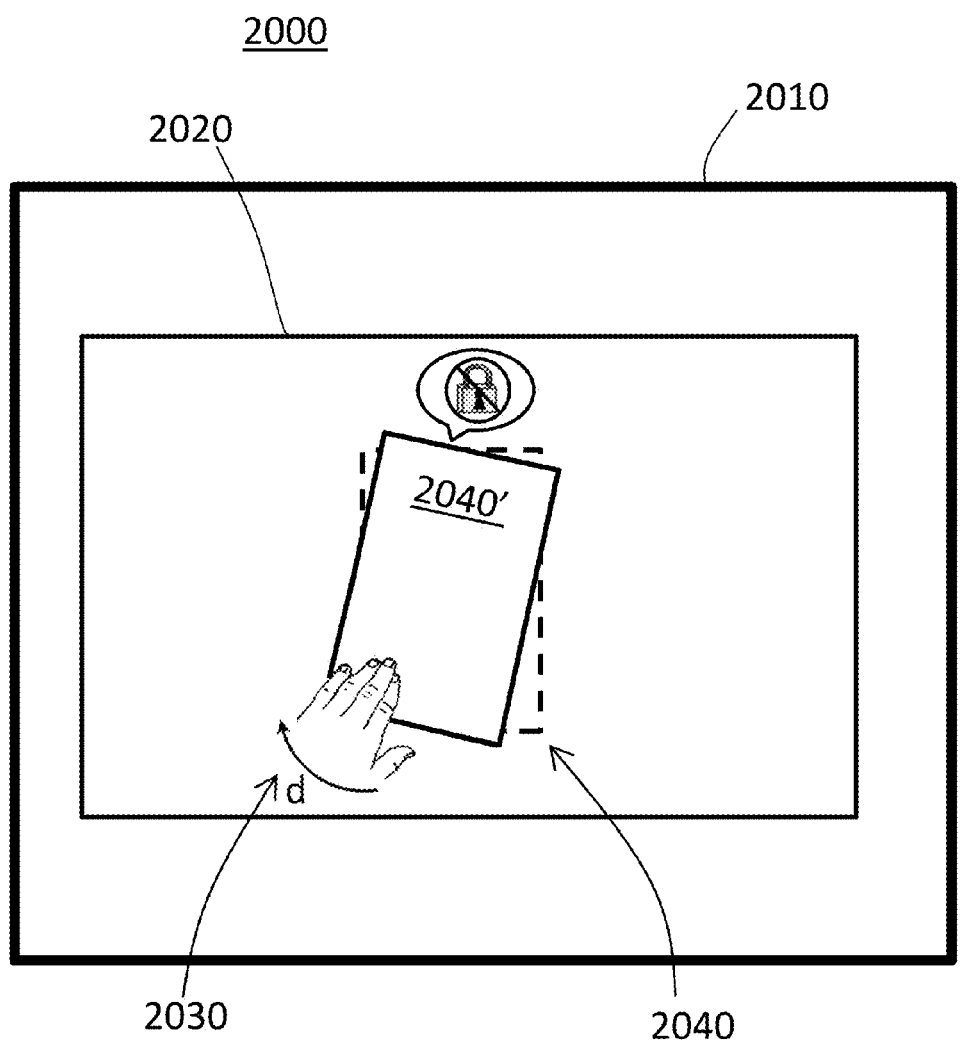

FIGS. 20A and 20B illustrate locked and unlocked displayed virtual objects. In FIG. 20A, a system 2000 includes a display device 2010 having a canvas 2020. A virtual object 2040 is displayed within the canvas 2020, and has restrictions on movement, e.g., the virtual object 2040 may be locked. However, due to a system error or an incomplete classification, the virtual object 2040 was restricted when the virtual object 2040 should not have been. A touch input 2030 is provided to the virtual object 2040, and since the virtual object 2040 is incorrectly subject to restriction to rotational movement, the touch input 2030 does not cause rotation of the virtual object 2040.

In FIG. 20B, the system 2000 determines the rotational motion provided by the touch input 2030 to be intentional and, thus, determines that the virtual object 2040 was incorrectly restricted. Based on the determination that the virtual object 2040 was incorrectly restricted, the system 200 rewinds the state of the system 2000 to a state that would have resulted had the virtual object 2040 been properly left unrestricted. For instance, restrictions on the virtual object 2040 are removed, e.g., the virtual object 2040 may be unlocked and the touch input 2030 is reevaluated to cause rotation of the virtual object 2040 that was previously suppressed. Accordingly, the touch input 2030 causes rotation of the virtual object 2040 along the rotational direction "d" and the virtual object 2040 is now displayed on the displayed device 210 as the virtual object 2040'.

What is claimed is:

1. A method comprising:
    displaying multiple virtual objects on a display of a display device;
    storing, in non-volatile memory of the display device, information regarding a state of the display device, the state including a location, a position, and restrictions placed on each virtual object of the multiple virtual objects displayed on the display device;
    detecting a stylus input on a subset of the multiple virtual objects;
        based on at least detecting the stylus input on the subset of the multiple virtual objects, restricting, for the subset of the multiple virtual objects, responsiveness to a gesture input;
    detecting the gesture input applied to a first virtual object included in the subset of the multiple virtual objects and a second virtual object included in the multiple virtual objects, but excluded from the subset of the multiple virtual objects;
    based on detecting the gesture input applied to the first virtual object and the second virtual object:
        storing, in non-volatile memory of the display device, the gesture input applied to the first virtual object and the second virtual object, and the restriction to responsiveness to the gesture input for the first virtual object;
        controlling a movement of the first virtual object in accordance with the restricted responsiveness to the gesture input, and
        controlling a movement of the second virtual object without restriction;
        detecting that a prior restriction decision applied to the first virtual object was incorrect;
        updating, based on at least detecting that the prior restriction decision applied to the first virtual object was incorrect, the prior restriction decision applied to the first virtual object to a correct restriction decision; and
        reverting, based on at least the information regarding the state of the display device, the stored gesture input applied to the first virtual object, and the correct restriction decision, a state of the display device to reflect a state that would have resulted had the correct restriction decision been made.

2. The method of claim 1, wherein performing the operation related to restricting, for the subset of the multiple virtual objects, responsiveness to the gesture input comprises restricting, for the subset of the multiple virtual objects, a movement that occurs based on the gesture input, the movement that occurs based on the gesture input for the subset of the multiple virtual objects being less than a movement that occurs based on the gesture input for the multiple virtual objects that are excluded from the subset of the multiple virtual objects.

3. The method of claim 1, wherein restricting, for the subset of the multiple virtual objects, responsiveness to the gesture input comprises locking the subset of the multiple virtual objects such that the subset of the multiple virtual objects are unresponsive to the gesture input, and wherein controlling a movement of the first virtual object in accordance with the restricted responsiveness to the gesture input comprises:
    ignoring the gesture input applied to the first virtual object, and
    maintaining a position of the first virtual object despite the gesture input applied to the first virtual object.

4. The method of claim 1, wherein restricting, for the subset of the multiple virtual objects, responsiveness to the gesture input includes increasing an inertia of the subset of the multiple virtual objects such that the subset of the multiple virtual objects are responsive to the gesture input, but less responsive than prior to the increase in the inertia.

5. The method of claim 1, wherein restricting, for the subset of the multiple virtual objects, responsiveness to the gesture input includes:
    detecting a stylus hovering over the first virtual object;
    based on detecting the stylus hovering over the first virtual object, increasing an inertia of the first virtual object such that the first virtual object is responsive to the gesture input, but less responsive than prior to the increase in the inertia;
    detecting the stylus contacting the first virtual object; and
    based on detecting the stylus contacting the first virtual object, locking the first virtual object such that the first virtual object is unresponsive to the gesture input.

6. The method of claim 1:
    wherein restricting, for the subset of the multiple virtual objects, responsiveness to the gesture input comprises configuring the subset of the multiple virtual objects to remain unresponsive to the gesture input until a threshold level of the gesture input has been met;
    and wherein controlling a movement of the first virtual object in accordance with the restricted responsiveness to the gesture input comprises damping a motion of the first virtual object until the gesture input applied to the first virtual object meets the threshold level.

7. The method of claim 1, further comprising:
    detecting an alteration event of the first virtual object;
    determining a time window to apply based upon the detected alteration event of the first virtual object and a history of alteration activity of the first virtual object;
    detecting a potential end of the alteration event;

based on at least detecting the potential end of the alteration event, continuing to restrict the movement of the first virtual object continuously during the determined time window;

monitoring, during the determined time window, for an input indicating a return to the alteration event; and releasing, based on the determined time window expiring without detecting the input indicating the return to the alteration event during the monitoring, the restriction on the movement of the first virtual object.

8. The method of claim 1:
wherein restricting, for the subset of the multiple virtual objects, responsiveness to the gesture input comprises:
determining, for the first virtual object, a first constraint to place on a first type of motion that occurs based on the gesture input;
determining, for the first virtual object, a second constraint to place on a second type of motion that occurs based on the gesture input, the second constraint being different from the first constraint and the second type of motion being different from the first type of motion;
restricting, for the first virtual object, responsiveness to the first type of motion that occurs based on the gesture input in accordance with the first constraint; and
restricting, for the first virtual object, responsiveness to the second type of motion that occurs based on the gesture input in accordance with the second constraint; and
wherein controlling a movement of the first virtual object in accordance with the restricted responsiveness to the gesture input comprises:
controlling the first type of motion that occurs based on the gesture input applied to the first virtual object in accordance with the first constraint; and
controlling the second type of motion that occurs based on the gesture input applied to the first virtual object in accordance with the second constraint.

9. The method of claim 8:
wherein determining, for the first virtual object, the first constraint to place on the first type of motion that occurs based on the gesture input comprises determining, for the first virtual object, the first constraint to place on a translation that occurs based on the gesture input;
wherein determining, for the first virtual object, the second constraint to place on the second type of motion that occurs based on the gesture input comprises determining, for the first virtual object, the second constraint to place on a rotation that occurs based on the gesture input;
wherein controlling the first type of motion that occurs based on the first type of input applied to the first virtual object in accordance with the first constraint comprises controlling the translation of the first virtual object that occurs based on the gesture input applied to the first virtual object in accordance with the first constraint; and
wherein controlling the second type of motion that occurs based on the gesture input applied to the first virtual object in accordance with the second constraint comprises controlling the rotation of the first virtual object that occurs based on the gesture input applied to the first virtual object in accordance with the second constraint.

10. The method of claim 8: wherein determining, for the first virtual object, the first constraint to place on the first type of motion that occurs based on the gesture input comprises determining, for the first virtual object, the first constraint to place on a scaling that occurs based on the gesture input;
wherein determining, for the first virtual object, the second constraint to place on the second type of motion that occurs based on the gesture input comprises determining, for the first virtual object, the second constraint to place on a rotation that occurs based on the gesture input;
wherein controlling the first type of motion that occurs based on the gesture input applied to the first virtual object in accordance with the first constraint comprises controlling the scaling of the first virtual object that occurs based on the gesture input applied to the first virtual object in accordance with the first constraint; and
wherein controlling the second type of motion that occurs based on the gesture input applied to the first virtual object in accordance with the second constraint comprises controlling the rotation of the first virtual object that occurs based on the gesture input applied to the first virtual object in accordance with the second constraint.

11. The method of claim 8:
wherein determining, for the first virtual object, the first constraint to place on the first type of motion that occurs based on the gesture input comprises determining, for the first virtual object, the first constraint to place on a translation that occurs based on the gesture input;
wherein determining, for the first virtual object, the second constraint to place on the second type of motion that occurs based on the gesture input comprises determining, for the first virtual object, the second constraint to place on a scaling that occurs based on the gesture input;
wherein controlling the first type of motion that occurs based on the gesture input applied to the first virtual object in accordance with the first constraint comprises controlling the translation of the first virtual object that occurs based on the gesture input applied to the first virtual object in accordance with the first constraint; and
wherein controlling the second type of motion that occurs based on the gesture input applied to the first virtual object in accordance with the second constraint comprises controlling the scaling of the first virtual object that occurs based on the gesture input applied to the first virtual object in accordance with the second constraint.

12. The method of claim 1, further comprising updating the display of the multiple virtual objects to indicate the subset of the multiple virtual objects that have restricted responsiveness to the gesture input.

13. The method of claim 1, further comprising updating the display of the multiple virtual objects to indicate a manner in which at least one of the subset of the multiple virtual objects has been restricted.

14. The method of claim 1, further comprising updating the display of the multiple virtual objects to indicate that the gesture input has been applied to the first virtual object, but that the gesture input that has been applied to the first virtual object has been restricted.

15. The method of claim 1, further comprising:
detecting that not applying the prior restriction decision to the second virtual object was incorrect;
updating, based on at least detecting that not applying the prior restriction decision to the second virtual object was incorrect, the prior restriction decision to a second correct restriction decision applied to the second virtual object; and
reverting, based on at least the information regarding the state of the display device, the stored gesture input applied to the second virtual object, and the second correct restriction decision, a state of the display device to reflect a state that would have resulted had the second correct restriction decision been made.

16. The method of claim 1:
wherein detecting that the prior restriction decision applied to the first virtual object was incorrect comprises detecting that a decision not to restrict the first virtual object was incorrect;
wherein updating the prior restriction decision applied to the first virtual object to the correct restriction decision comprises updating the decision not to restrict the first virtual object to a decision to restrict the first virtual object; and
wherein reverting a state of the display device to reflect a state that would have resulted had the correct restriction decision been made comprises reverting a state of the display device to reflect a state that would have resulted had the first virtual object been restricted.

17. The method of claim 1:
wherein detecting that the prior restriction decision applied to the first virtual object was incorrect comprises detecting that a decision to restrict the first virtual object was incorrect;
wherein updating the prior restriction decision applied the first virtual object to the correct restriction decision comprises updating the decision to restrict the first virtual object to a decision not to restrict the first virtual object; and
wherein reverting a state of the display device to reflect a state that would have resulted had the correct restriction decision been made comprises reverting a state of the display device to reflect a state that would have resulted had the first virtual object not been restricted.

18. A computing system, comprising:
a display device;
a non-volatile memory device; and
a processor configured to:
display multiple virtual objects on the display device;
store, in the non-volatile memory device, information regarding a state of the display device, the state including a location, a position, and restrictions placed on each virtual object of the multiple virtual objects displayed on the display device;
detect a stylus input on a subset of the multiple virtual objects;
based on at least detecting the stylus input on the subset of the multiple virtual objects, restricting, for the subset of the multiple virtual objects, responsiveness to a gesture input;
detect the gesture input applied to a first virtual object included in the subset of the multiple virtual objects and a second virtual object included in the multiple virtual objects, but excluded from the subset of the multiple virtual objects;
based on detecting the gesture input applied to the first virtual object and the second virtual object:
store, in the non-volatile memory device, the gesture input applied to the first virtual object and the second virtual object, and the restriction to responsiveness to the gesture input for the first virtual object,
control a movement of the first virtual object in accordance with the restricted responsiveness to the gesture input,
control a movement of the second virtual object without restriction,
detect that a prior restriction decision applied to the first virtual object was incorrect,
update, based on at least detecting that the prior restriction decision applied to the first virtual object was incorrect, the prior restriction decision applied to the first virtual object to a correct restriction decision, and
revert, based on at least the information regarding the state of the display device, the stored gesture input applied to the first virtual object, and the correct restriction decision, a state of the display device to reflect a state that would have resulted had the correct restriction decision been made.

* * * * *